US007450895B2

(12) United States Patent
Oomura et al.

(10) Patent No.: US 7,450,895 B2
(45) Date of Patent: Nov. 11, 2008

(54) INFORMATION PROCESSING APPARATUS AND INFORMATION PROCESSING METHOD FOR USE IN GENERATING IMAGE DATA

(75) Inventors: Hiroshi Oomura, Kanagawa (JP); Yasuhiro Kujirai, Tokyo (JP); Yoshihiro Takagi, Kanagawa (JP); Tatsuro Uchida, Kanagawa (JP); Masanori Aritomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 724 days.

(21) Appl. No.: 10/959,685

(22) Filed: Oct. 6, 2004

(65) Prior Publication Data
US 2005/0078993 A1 Apr. 14, 2005

(30) Foreign Application Priority Data
Oct. 10, 2003 (JP) ............................. 2003-352980
Jul. 22, 2004 (JP) ............................. 2004-214789

(51) Int. Cl.
*G03G 21/00* (2006.01)
(52) U.S. Cl. ..................... 399/366; 283/902; 358/1.14
(58) Field of Classification Search ................ 399/366; 283/72, 94, 902; 430/10; 428/915; 380/51, 380/54, 55; 705/59; 358/1.14, 296, 300, 358/3.28
See application file for complete search history.

(56) References Cited

U.S. PATENT DOCUMENTS

| 5,788,285 | A | | 8/1998 | Wicker | |
|---|---|---|---|---|---|
| 5,832,186 | A | * | 11/1998 | Kawana | ...................... 358/1.9 |
| 5,917,996 | A | * | 6/1999 | Thorpe | ...................... 358/1.14 |
| 6,000,728 | A | | 12/1999 | Mowry, Jr. | |
| 6,515,755 | B1 | * | 2/2003 | Hasegawa | .................. 358/1.14 |
| 6,692,030 | B1 | * | 2/2004 | Phillips | ........................ 283/91 |
| 7,131,775 | B2 | * | 11/2006 | Uchida et al. | .................. 400/62 |
| 7,149,451 | B2 | * | 12/2006 | Uchida et al. | .................. 399/81 |
| 7,243,952 | B2 | * | 7/2007 | Shimada et al. | ............... 283/93 |
| 7,274,890 | B2 | * | 9/2007 | Uchida et al. | .................. 399/81 |
| 2004/0051885 | A1 | * | 3/2004 | Matsunoshita | .............. 358/1.9 |
| 2005/0058476 | A1 | * | 3/2005 | Murakami | ................... 399/366 |
| 2005/0162682 | A1 | * | 7/2005 | Aritomi et al. | ............. 358/1.14 |
| 2005/0190411 | A1 | * | 9/2005 | Ohno | ........................ 358/3.28 |
| 2006/0067759 | A1 | * | 3/2006 | Osaka | ........................ 399/366 |

(Continued)

FOREIGN PATENT DOCUMENTS

JP 10278408 A * 10/1998

(Continued)

*Primary Examiner*—Robert Beatty
(74) *Attorney, Agent, or Firm*—Canon U.S.A. Inc., I.P. Division

(57) ABSTRACT

An information processing apparatus generates printing image data of a printing image and copy-forgery-inhibited-pattern-image data of a copy-forgery-inhibited pattern image to be added to the printing image. The copy-forgery-inhibited pattern image includes a latent image and a background image. The apparatus includes a selecting unit and a printing-data generating unit. The selecting unit selects either the transparent-printing designation or overlay-printing designation, the transparent-printing designation is used for generating printing data so that the copy-forgery-inhibited pattern image is superimposed on the printing image, and the overlay-printing designation is used for generating printing data so that the printing image is superimposed on the copy-forgery-inhibited pattern image. The printing-data generating unit generates printing data based on the printing designation selected by the selecting unit.

21 Claims, 29 Drawing Sheets

U.S. PATENT DOCUMENTS

| | | | |
|---|---|---|---|
| 2006/0280515 A1* | 12/2006 | Harada | 399/80 |
| 2007/0003294 A1* | 1/2007 | Yaguchi et al. | 399/15 |
| 2007/0025787 A1* | 2/2007 | Harada | 399/366 |

FOREIGN PATENT DOCUMENTS

| | | | |
|---|---|---|---|
| JP | 11098345 A * | 4/1999 | |
| JP | 2001-197297 A | 7/2001 | |
| JP | 2001197297 A * | 7/2001 | |
| JP | 2001-238075 A | 8/2001 | |
| JP | 2001238075 A * | 8/2001 | |

* cited by examiner

FIG. 9

| |
|---|
| JOB-IDENTIFIABLE ID ~1001 |
| JOB-SETTING INFORMATION ~1002 |
| NUMBER OF PHYSICAL PAGES OF JOB ~1003 |
| FIRST PHYSICAL-PAGE INFORMATION ~1004 |
| SECOND PHYSICAL-PAGE INFORMATION ~1005 |
| . . . . ~1006 |
| LAST PHYSICAL-PAGE INFORMATION ~1007 |

FIG. 10

| |
|---|
| TOTAL NUMBER OF PHYSICAL PAGES ~1101 |
| TOTAL NUMBER OF LOGICAL PAGES ~1102 |
| NUMBER OF COPIES ~1103 |
| COPY-UNIT PRINTING ~1104 |
| FINISHING INFORMATION ~1105 |
| ADDITIONAL PRINTING INFORMATION ~1106 |

FIG. 11

| | |
|---|---|
| PHYSICAL PAGE NUMBER | 1201 |
| PHYSICAL-PAGE-SETTING INFORMATION | 1202 |
| NUMBER n OF LOGICAL PAGES TO BE ASSIGNED TO PHYSICAL PAGES | 1203 |
| FIRST LOGICAL-PAGE INFORMATION | 1204 |
| SECOND LOGICAL-PAGE INFORMATION | 1205 |
| . . . . | 1206 |
| n-TH LOGICAL-PAGE INFORMATION | 1207 |

FIG. 14

| | |
|---|---|
| TYPE OF OBJECT TO BE DRAWN BY USING COPY-FORGERY-INHIBITED-PATTERN IMAGE (TEXT/IMAGE) | 2001 |
| INPUT FILE NAME (IMAGE SELECTING MODE) FONT INFORMATION (TEXT SELECTING MODE) | 2002 |
| PRINTING ORDER (TRANSPARENT/OVERLAY) | 2003 |
| DRAWING-OBJECT ANGLE INFORMATION | 2004 |
| COLOR INFORMATION | 2005 |
| INFORMATION CONCERNING WHETHER TO SWITCH FOREGROUND AND BACKGROUND PATTERNS | 2006 |
| CAMOUFLAGE-IMAGE ADDITIONAL PATTERN INFORMATION | 2007 |
| FOREGROUND-PATTERN DENSITY INFORMATION | 2008 |
| BACKGROUND-PATTERN DENSITY INFORMATION | 2009 |

FIG. 29
(A) 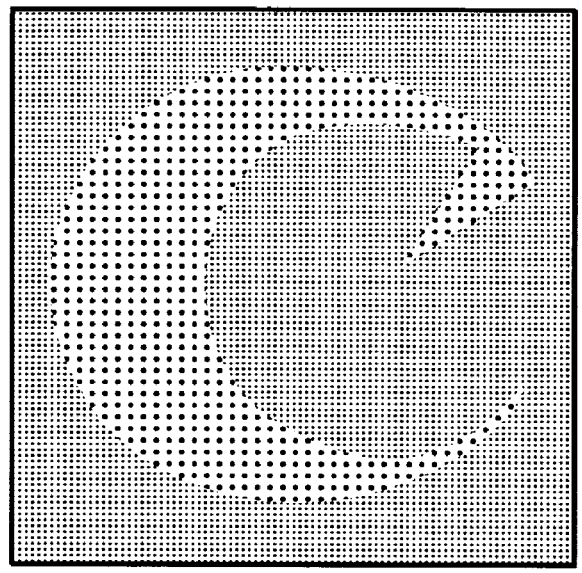
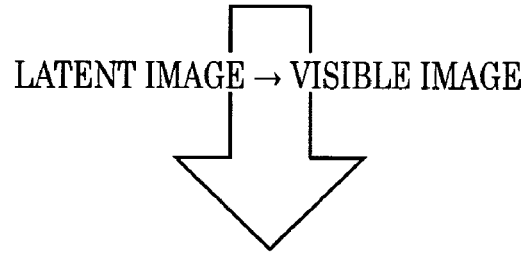
LATENT IMAGE → VISIBLE IMAGE
(B) 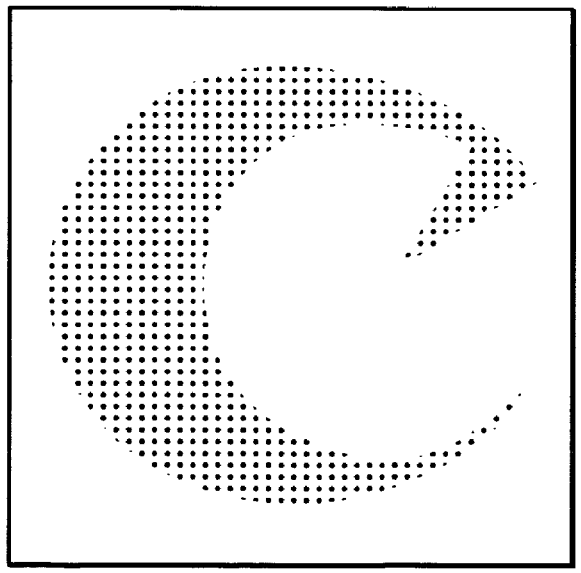

INFORMATION PROCESSING APPARATUS AND INFORMATION PROCESSING METHOD FOR USE IN GENERATING IMAGE DATA

CROSS-REFERENCE

This application claims priority from Japanese Patent Application No. 2003-352980 filed on Oct. 10, 2003, and Japanese Patent Application No. 2004-214789 filed on Jul. 22, 2004, which are hereby incorporated by reference herein.

BACKGROUND OF THE INVENTION

1. Field of the Invention

The present invention relates to an information processing apparatus and an information processing method. More particularly, the present invention relates to processing which, in a system including an information processing apparatus, such as a personal computer, and a printer, prints a picture including a copy-forgery-inhibited pattern image for use in distinctly distinguishing between the original and a copy thereof.

2. Description of the Related Art

Conventionally, for the purpose of inhibiting or preventing copying of documents, such as forms and certificates of residence, paper obtained by special printing, called "anti-counterfeit paper", has been used. When the original document made of the anti-counterfeit paper is copied using a copying machine or the like, characters, such as "COPY", become visible on a copy sheet. These characters exist on the original document, but it is difficult for them to be seen by the human eye. Printing of characters on the copy enables visual recognition of the difference(s) between the original document and the copy. The use of the anti-counterfeit paper prevents a person who copies from using the copy. In addition, the use of the anti-counterfeit paper produces a psychological barrier effect of preventing a copying action itself. The reason that the character on the original document made of the anti-counterfeit paper is barely visible is because the original and its copy have to be distinctly distinguishable from each other. If the original bears a character string, such as "COPY", that appears clearly recognizable to the human eye, the original document can be mistaken as a copy.

U.S. Pat. No. 5,788,285 (Wicker) and U.S. Pat. No. 6,000,728 (Mowry, et al.) disclose techniques for producing the above-described anti-counterfeit paper.

A problem with producing anti-counterfeit paper is that it costs more to produce than ordinary paper since the anti-counterfeit paper requires utilizing special printing technology. In addition, only characters which are set when the anti-counterfeit paper is produced can become visible. Accordingly, uses of the anti-counterfeit paper and the character string to be set are limited. In other words, the anti-counterfeit paper of the related art has little flexibility in use due to limitations in production.

With the progress of converting various types of content from one form into another (i.e., hardcopy into digital), content such as forms and certificates of residence have begun to be converted into digital data. Despite the digitization of content, the use of the content is still the same. For example, digital data content created by a computer is printed out onto a record medium (i.e. paper) via a printer when the digital data content needs to be used.

In such circumstances, on-demand printing technology is useful. This is due in part to recent significant improvements in the performance of printers. In on-demand printing technology, a computer and a printer are used to produce printed paper having advantages similar to those of the above-described anti-counterfeit paper. Japanese Patent Laid-Open Nos. 2001-197297 and 2001-238075 disclose a technology in which, when computer-created content data is printed out using a printer, the content data is printed in a form in which an image called a "copy-forgery-inhibited pattern image" is superimposed on the background of the content data. To the human eye, the copy-forgery-inhibited pattern image looks like a simple pattern or background color on the original (i.e., printed paper produced by the printer). However, when the original is copied, a predetermined character string, or the like, becomes visible on the copy. This provides the copy prevention effect that of anti-counterfeit paper does.

In the case of printing content in a form in which a copy-forgery-inhibited pattern image created by a computer is superimposed, ordinary printing paper or the like can be used. Accordingly, as compared with anti-counterfeit paper, this approach provides a cost advantage. In addition, when content is printed, the copy-forgery-inhibited pattern image can be created, unlike with anti-counterfeit paper, where the character has to be set at the time the paper is produced. This makes it possible to freely set characters, etc., which become visible in the process of copying. For example, dynamic information, such as the name of a user who performs printing and a date and time of printing, can become visible as a character string.

By using the copy-forgery-inhibited pattern image in the process of copying, a predetermined character string or the like, which is not recognizable prior to copying, becomes visible on a copy. This provides an advantage in that there is a visual distinction between the copy and the original that can easily be recognized, thus preventing the copy from being used improperly.

The copy-forgery-inhibited pattern image basically consists of two areas. In one area, a part of the image remains (i.e., appears) on the copy in the process of copying. In the other area, in the process of copying, a part of the image becomes invisible, or a part of the image becomes hardly recognizable since it becomes thinner than the remaining area. The two areas have approximately equal densities in printed state. In a macroscopic view, it cannot be recognized that characters, such as "COPY", which become visible in the process of copying are hidden (embedded). However, in a microscopic view, for example, in printed dot level, the areas have different characteristics.

For brevity of description, an image which becomes visible in the process of copying is hereinafter referred to as a "latent image", and an image which becomes invisible or thinner in the process of copying is hereinafter referred to as a "background image". In a user interface, the latent image may be referred to as the "foreground image". The copy-forgery-inhibited pattern image consists of the latent image and the background image. In addition, the copy-forgery-inhibited pattern image may further include a camouflage image, which is described below.

Copy-forgery-inhibited pattern printing is not limited to printing based on the above configuration. The copy-forgery-inhibited pattern image may be constructed so that a character string, such as "COPY", a logotype, a pattern, or the like, appears (i.e., becomes visible) on a copy in a state recognizable by the human eye. In other words, even if a copy bears the character string "COPY" spelled in reverse, the purpose of copy-forgery-inhibited pattern printing has been achieved. In this case, obviously, the character string "COPY" has been generated as a background image.

In the case of electro-photography and printing using dot printers such ink-jet printers, on a copy, the image-remaining area (i.e., latent-image area) or the foreground-image area is formed by sets of concentrated dots. An area in which an image disappears on a copy (i.e., background-image area), or an image is reproduced in density less than that of the image in the image-remaining area, is formed by sets of dispersed dots. By setting both areas to have approximately equal densities in a state in which the copy-forgery-inhibited pattern image is printed, the density of the entirety of the copy-forgery-inhibited pattern image can be set to be approximately uniform.

FIG. 28 is an example depicting latent-image and background-image areas. As shown in FIG. 28, the copy-forgery-inhibited pattern image consists of a background-image area formed by dispersed dots, as indicated by the smaller circle, and a latent-image area formed by sets of dots as indicated by the larger circle. The two areas can be formed by different halftone dot processes or different dither processes. To create a copy-forgery-inhibited pattern image by using screen processes, a screen process using a screen pattern of a low number of lines is adapted for forming a latent-image area, and a screen pattern of a high number of lines is adapted for forming a background-image area. To create a copy-forgery-inhibited pattern image by using dither processes, a dither process using a dot-concentrated-type dither matrix is adapted for forming a latent-image area, and a dither process using a dot-distributed-type dither matrix is adapted for forming a background-image area.

In general, copying machines have limits with respect to their reproducing capability that is dependent on an input resolution at which minute dots on a document are read and an output resolution at which the minute dots are reproduced. When each dot of a background-image area in a copy-forgery-inhibited pattern image is formed to be smaller than a dot size limit reproducible by a copying machine, and sets of dots of a latent-image area are each formed to be larger than the dot size limit, copying reproduces on a copy, an image formed by the large dots in the copy-forgery-inhibited pattern image, and does not reproduce an image formed by the small dots. As a result, the latent-image area becomes visible. In addition, even if copying does not cause the small dots, which are dispersed, to become completely invisible, and the density of the small dots obtained after the copying is lower than that of the sets of concentrated dots, the latent-image area can be relatively clearly recognized.

FIG. 29 illustrates a process in which a latent-image area becomes visible. In FIG. 29, portion (A) shows a copy-forgery-inhibited pattern image in printed form and portion (B) shows the state of a copy obtained when a document bearing the copy-forgery-inhibited pattern image is copied by a copying machine. From portions (A) and (B) in FIG. 29, it can be understood that sets of concentrated dots form a latent-image area and a background-image area formed by dispersed dots becomes invisible.

In addition, it is well known that the technique of "camouflaging" is applied to copy-forgery-inhibited pattern images. Camouflaging makes it difficult to recognize that a latent image is embedded in the original. Camouflaging is a technique that superimposes, on a copy-forgery-inhibited pattern image, a pattern having a density different from the densities of a latent-image area and a background-image area. An advantage of applying camouflaging on the original bearing a copy-forgery-inhibited pattern image is that the camouflaged image is noticeable since it has a density different from the densities of a latent-image area and a background-image area, and the latent-image area is less noticeable. According to another advantage, a camouflaged image causes a printed sheet to have a decorative effect.

Turning to FIG. 30, the left image in shows a copy-forgery-inhibited pattern image bearing no camouflage. The right image shows a copy-forgery-inhibited pattern image with a camouflaged image. In order for a latent-image area to be easily recognized on a copy after copying, it is preferable that dots constituting the camouflaged image be not reproduced on the copy. This is realized such that, as shown in the right image of FIG. 30, the camouflaged image is printed in voided form.

A person who uses an unauthorized copy may make corrections such as deletion by painting in white a latent-image area made visible by copying the original. In order to prevent the latent-image area from being eliminated by such an unauthorized action, it is preferable that the copy-forgery-inhibited pattern image be printed over the entirety of printing paper to ensure that portions of the latent-image area be formed even in a blank area of the original, which may not have any content.

Accordingly, as illustrated in FIG. 24, copy-forgery-inhibited-pattern image blocks 3501, each consisting of a latent-image area (the character string "VOID") and a background-image area, are repeatedly printed over the entirety of printing paper. This creates a copy-forgery-inhibited-pattern tiling image 3502.

An application of the copy-forgery-inhibited-pattern tiling image 3502 to document data is depicted in FIG. 26. FIG. 26 shows printed drawing data. The drawing data is generated by drawing the copy-forgery-inhibited-pattern tiling image 3502 on a built-in bitmap memory of a printer, and subsequently overwriting the memory with the document data shown in FIG. 25. In other words, FIG. 26 shows that the copy-forgery-inhibited-pattern tiling image 3502 is used as a base layer and the document data is superimposed thereon. In this case, as shown in FIG. 25, the document data has a large blank part, that is, a large area having no drawing data. Accordingly, as shown in FIG. 26, there are relatively many portions in which the latent-image area does not overlap with the document data. This consequently enables recognition of the latent-image area on a copy.

However, in document data created with a layer effect, a "white background image" may be used for the background of the document. In the case of combining the above document data and a copy-forgery-inhibited pattern image, when the copy-forgery-inhibited pattern image is drawn before drawing the document data, the latent-image area cannot be recognized. For example, as FIG. 27 shows, the copy-forgery-inhibited pattern image is painted out by the document image even if the copy-forgery-inhibited pattern image is embedded over the entirety of printing paper in the form of a copy-forgery-inhibited-pattern tiling image.

As described above, factors, such as the document data to be printed, as well as the application for creating the document data, may create a situation where, despite combining the document data and a copy-forgery-inhibited pattern image, the resultant printed sheet is not useful as anti-counterfeit paper.

SUMMARY OF THE INVENTION

The present invention has been made in order to solve the above problems by providing an information processing apparatus and method for producing a printed sheet having a copy-forgery-inhibited pattern image appropriately combined thereon regardless of document data.

According to an aspect of the present invention, an information processing apparatus for generating printing image data of a printing image and copy-forgery-inhibited-patternimage data of a copy-forgery-inhibited pattern image to be added to the printing image is provided. The copy-forgery-inhibited pattern image includes a latent image and a background image. The information processing apparatus includes a selecting unit for selecting either the transparent-printing designation or overlay-printing designation, the transparent-printing designation being used for generating printing data so that the copy-forgery-inhibited pattern image is superimposed on the printing image, the overlay-printing designation being used for generating printing data so that the printing image is superimposed on the copy-forgery-inhibited pattern image, and a printing-data generating unit for generating printing data based on the printing designation selected by the selecting unit.

According to another aspect of the present invention, an information processing apparatus for generating printing image data of a printing image and copy-forgery-inhibited-pattern-image data of a copy-forgery-inhibited pattern image to be added to the printing image is provided. The copy-forgery-inhibited pattern image includes a latent image and a background image. The information processing apparatus includes a layer determining unit for executing a determining process of determining one of two printing manners on the basis of the amount of superimposition between the copy-forgery-inhibited pattern image and the printing image in a printable area on a printing medium, one printing manner being used for superimposing the copy-forgery-inhibited pattern image on the printing image, the other printing manner being used for superimposing the printing image on the copy-forgery-inhibited pattern image, and a printing-data generating unit for generating printing data in response to the result of determination in the determining process executed by the layer determining unit.

According to another aspect of the present invention, an information processing method for generating printing image data of a printing image and copy-forgery-inhibited-pattern-image data of a copy-forgery-inhibited pattern image to be added to the printing image is provided. The copy-forgery-inhibited pattern image includes a latent image and a background image. The information processing method includes a layer determining step of executing a determining process of determining one of two printing manners on the basis of the amount of superimposition between the copy-forgery-inhibited pattern image and the printing image in a printable area on a printing medium, one printing manner being used for superimposing the copy-forgery-inhibited pattern image on the printing image, the other printing manner being used for superimposing the printing image on the copy-forgery-inhibited pattern image, and a printing-data generating step of generating printing data in response to the result of determination by the determining process in the layer determining step.

According to another aspect of the present invention, a control program for generating printing image data of a printing image and copy-forgery-inhibited-pattern-image data of a copy-forgery-inhibited pattern image to be added to the printing image is provided. The copy-forgery-inhibited pattern image includes a latent image and a background image. The control program executes a selecting step of selecting either the transparent-printing designation or the overlay-printing designation, the transparent-printing designation being used for generating printing data so that the copy-forgery-inhibited pattern image is superimposed on the printing image, the overlay-printing designation being used for generating printing data so that the printing image is superimposed on the copy-forgery-inhibited pattern image, and a printing-data generating step of generating printing data based on the printing designation selected in the selecting step.

According to another aspect of the present invention, a control program for generating printing image data of a printing image and copy-forgery-inhibited-pattern-image data of a copy-forgery-inhibited pattern image to be added to the printing image is provided. The copy-forgery-inhibited pattern image includes a latent image and a background image. The control program executes a layer determining step of executing a determining process of determining one of two printing manners on the basis of the amount of superimposition between the copy-forgery-inhibited pattern image and the printing image in a printable area on a printing medium, one printing manner being used for superimposing the copy-forgery-inhibited pattern image on the printing image, the other printing manner being used for superimposing the printing image on the copy-forgery-inhibited pattern image, and a printing-data generating step of generating printing data in response to the result of the determination by the determining process in the layer determining step.

According to another aspect of the present invention, a computer-readable storage medium storing, in computer-executable form, one of the control programs is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is an illustration of an example of a data format for use in requesting the despooler 305 to perform physical page printing by the spool file manager 304.

FIG. 10 is an illustration of an example of the job setting information shown in the field 1002 shown in FIG. 9.

FIG. 11 is an illustration of an example of a data format for use in requesting the despooler 305 to perform physical page printing by the spool file manager 304.

FIG. 14 is an illustration of an example of the data format of the additional printing information 1304 shown in FIG. 12.

FIG. 29 consists of portions (a) and (b) illustrating a process in which a latent image becomes visible.

DESCRIPTION OF THE EMBODIMENTS

Embodiments of the present invention are described below with reference to the accompanying drawings.

FIGS. 1 to 24 illustrate configurations in a system including a host computer used as an information processing apparatus according to an embodiment of the present invention and a printer. The configurations are directed to a printing process and corresponding creation of basic drawing data for a copy-forgery-inhibited pattern image.

In this embodiment, an area that becomes visible on a copy obtained by copying is referred to as a "latent-image area" or a "foreground-image area". An area that becomes invisible or thinner than the latent-image area on the copy is referred to as a "background-image area". The latent-image area has input text information, such as "COPY" or "VOID". However, a copy-forgery-inhibited pattern image in the present invention is not limited to the above text information. The text information may be in the form of voided characters for a surrounding image. In this case, the above-described relationship between concentrated dots and dispersed dots in the latent-image area and background-image area is reverse to that in the case of using non-voided characters. The present invention is not limited to a copy-forgery-inhibited-pattern image type, creating process, color, and shape, etc.

Configuration of Printing System

Figure 1:
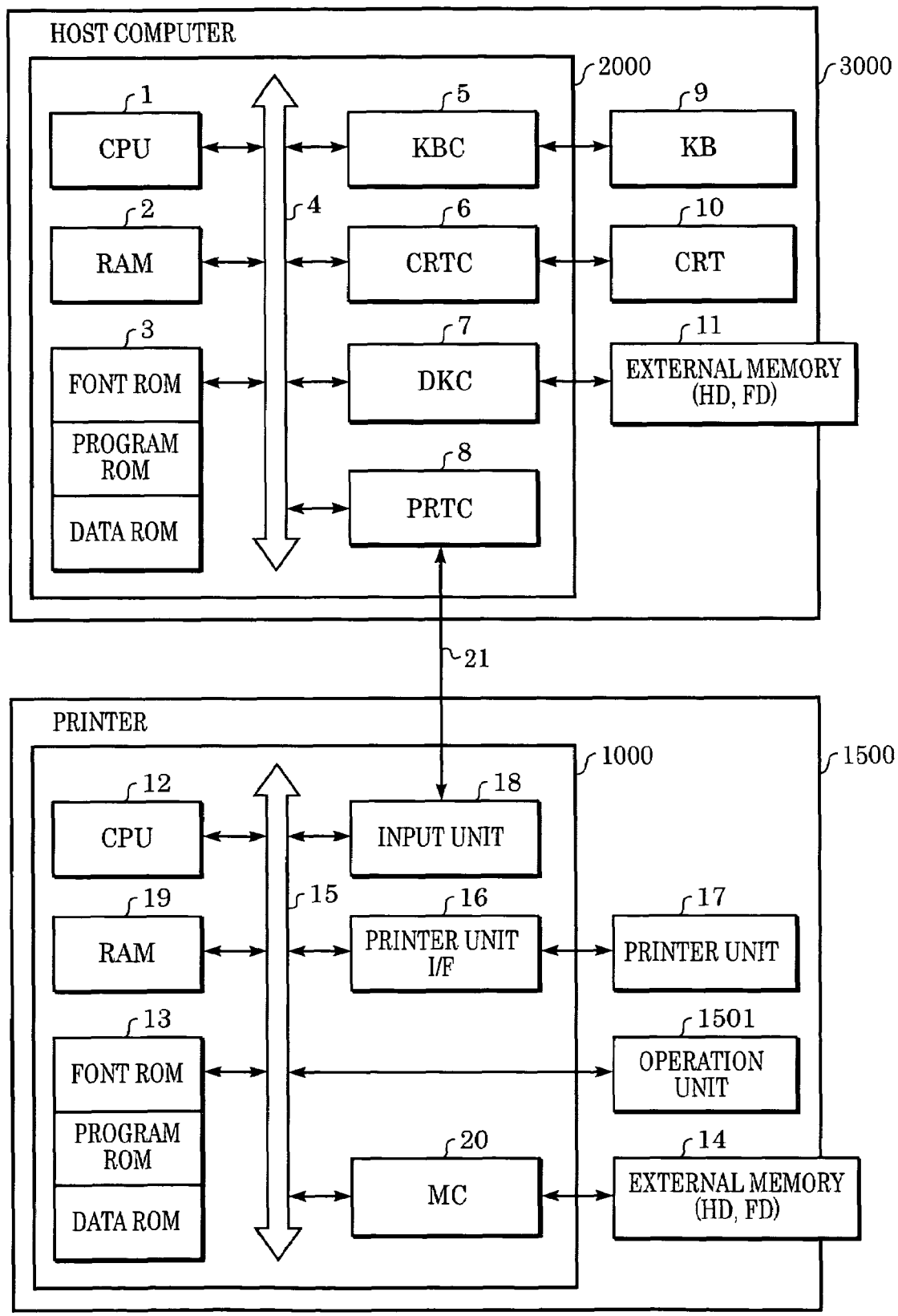
FIG. 1 is a block diagram illustrating a printing system according to an embodiment of the present invention.

FIG. 1 is a block diagram showing a printing system in the embodiment of the present invention. The present invention can be applied to a single apparatus, a system composed of plural apparatuses, or a system that uses a network, such as a local area network or wide area network, to establish connection for processing if the functions of the present invention are executed.

Referring to FIG. 1, a host computer 3000 includes a central processing unit (CPU) 1 which, based on a document processing program, or the like, stored in a program read-only memory (ROM) of a ROM 3 or an external memory 11, controls execution of document processing for a document having a mixture of figures, images, characters, a table (including a spread sheet), etc., and a printing process based on the document processing, which include processes (described below) according to the embodiments of the present invention. Overall, the CPU 1 controls the devices connected to system bus 4. The program ROM of the ROM 3 or the external memory 11 stores an operating system (OS), which is a program for controlling the CPU 1. A font ROM of the ROM 3 or the external memory 11 stores font data for use in the above document processing. A data ROM of the ROM 3 or the external memory 11 stores various types of data for use in the above document processing. A random access memory (RAM) 2 functions as a main memory and work area for the CPU 1.

A keyboard controller (KBC) 5 controls key inputting from a keyboard 9 and a pointing device (not shown). A cathode-ray-tube controller (CRTC) 6 controls display by a CRT display (CRT) 10 which displays the copy-forgery-inhibited pattern image(s). A disk controller (DKC) 7 controls accessing of the external memory 11, which is a hard disk (HD), a floppy disk (FD), or the like, and which stores a boot program, various applications, font data, a user file, an editing file, a printer-control-command generating program (printer driver), etc. A printer controller (PRTC) 8 is connected to a printer 1500 through a bidirectional interface 21 and executes processing of controlling communication with the printer 1500.

The CPU 1 executes, for example, loading (i.e., rasterization) of outline font data into a display information RAM set (not shown) in the RAM 2. This enables WYSIWYG (what you see is what you get) on the $CR_{T\ 10}$. In response to a command generated by manipulating a mouse cursor (not shown) on the $CR_{T\ 10}$, the CPU 1 opens various registered windows and executes various types of data processing. When a user performs printing, the user opens a printing setting window, can configure the printer 1500, and can configure a printing method for a printer driver, including selection of a printing mode.

The printer 1500 is controlled by a CPU 12 in the printer 1500. Based on a program such as a control program stored in a program ROM of a ROM 13, or a control program stored in an external memory 14, the CPU 12 outputs an image signal as printout information to a printer unit (i.e., printer engine) 17 connected to a system bus 15 via a printer unit interface 16. Program ROM of the ROM 13 stores a control program for the CPU 12. A font ROM of the ROM 13 stores font data for use in creating the printout information. A data ROM of the ROM 13 stores information for use in the host computer 3000 in the case of a printer where the external memory 14 is not provided.

The CPU 12 can communicate with the host computer 3000 through an input unit 18, and report in-printer information to the host computer 3000. A RAM 19 functions as a main memory or work memory for the CPU 12, and is configured so that its memory size is increased by using an option RAM connected to an expansion port (not shown). The RAM 19 is used as an output information loading area, an environmental data storage area, a nonvolatile random-access memory (NVRAM), or the like. A memory controller (MC) 20 controls accessing of the external memory 14. The external memory 14 is connected as an option, and stores font data, an emulation program, form data, etc. The input unit 18 is an operation panel having operation switches, light-emitting-device indicators, etc.

The number of external memories 14 is not limited to one, but may be a plural number. The plural number of external memories 14 can be connected to one another to store, among other things, internal font, option card data, and programs for interpreting different printer control languages. The external memory 14 may include an NVRAM (not shown) and may store printer-mode setting information from an operation unit 1501.

In this embodiment, an electro-photographic engine is used as the printer unit 17. Accordingly, a picture and a corresponding copy-forgery-inhibited pattern image are printed by toner dots formed based on printing data of the picture and copy-forgery-inhibited pattern image. In applications of the present invention, the printing method is not limited to the above electro-photographic method. For example, the present invention can be applied to a printer in accordance with any method of forming dots for printing, such as an ink-jet method.

Figure 2:
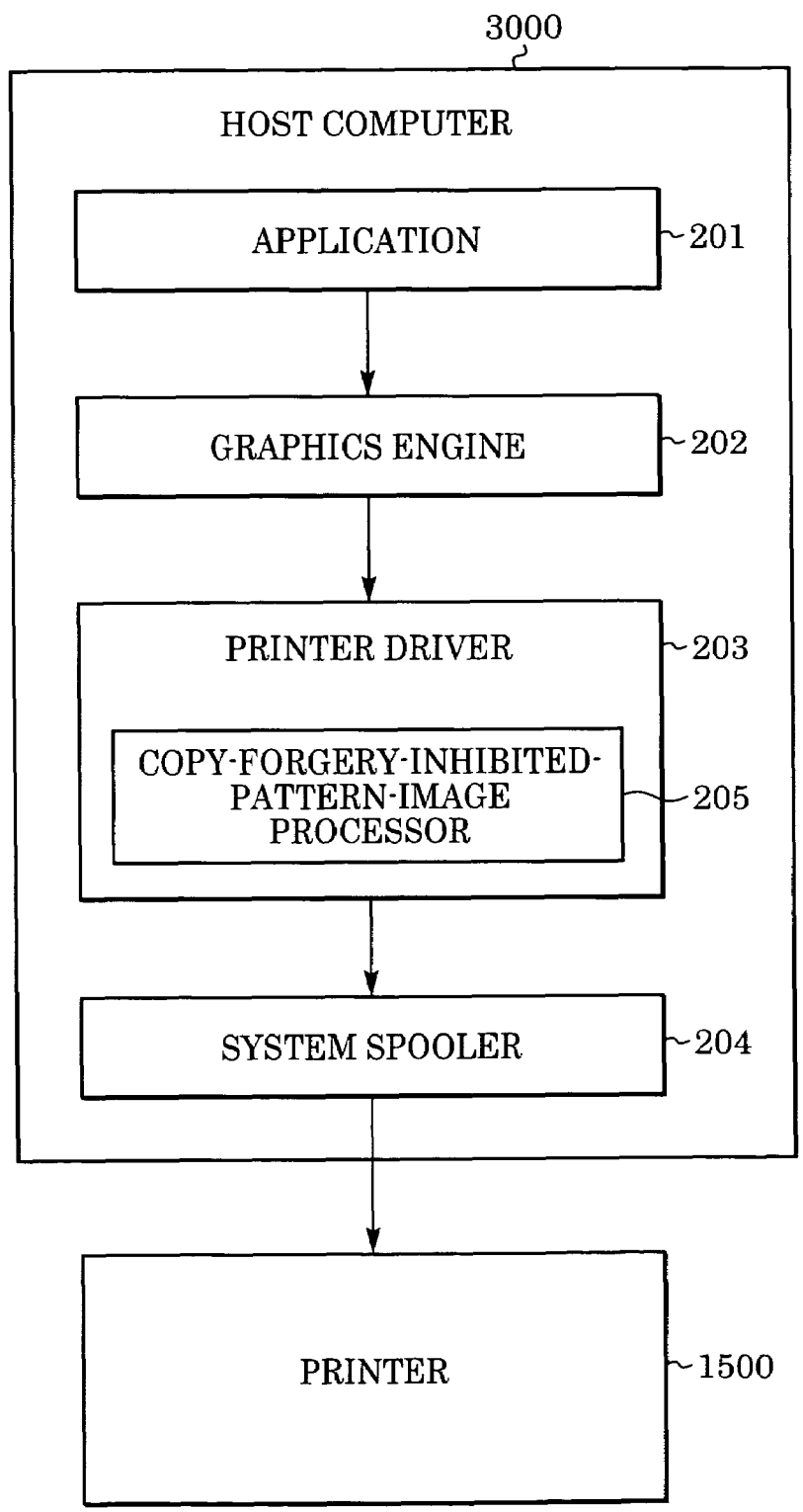
FIG. 2 is a block diagram illustrating an example of the printing-process configuration of the host computer 3000 shown in FIG. 1.

FIG. 2 is a block diagram showing a printing process configuration in the host computer 3000 shown in FIG. 1. An application 201, a graphics engine 202, a printer driver 203, and a system spooler 204 exist as files stored in the external memory 11, and are program modules which are to be executed before being loaded into the RAM 2 by the OS and functional units using the modules. The application 201 and the printer driver 203 can be added to the hard disk of the external memory 11 through the floppy dick of the external memory 11, a compact-disk read-only memory (CD-ROM) (not shown), or a network (not shown). The application 201 stored in the external memory 11 is executed after being loaded into the RAM 2. When the application 201 controls the printer 1500 to perform printing, the graphics engine 202, which is executable after being similarly loaded into the RAM 2, is used for output (e.g., drawing).

The graphics engine 202 loads the printer driver 203, which is prepared by the printer, from the external memory 11 into the RAM 2, and sets the output of the application 201 to be directed to the printer driver 203. The graphics engine 202 transforms a graphic device interface (GDI) function received from the application 201 into a device driver interface (DDI) function, and outputs the DDI function to the printer driver 203.

Based on the DDI function received from the graphics engine 202, the printer driver 203 performs transformation into a control command recognizable by the printer 1500, for example, a page description language (PDL). The page description language obtained by transformation can be output as printing data to the printer 1500 after passing through the system spooler 204 loaded into the RAM 2 by the OS through the interface 21.

In the printing system in this embodiment, the printer driver 203 includes a copy-forgery-inhibited-pattern-image processor 205. The copy-forgery-inhibited-pattern-image processor 205 may be a built-in module in the printer driver 203, or may be a library module which is added by separate installation. By executing the copy-forgery-inhibited-pattern-image processor 205 for printing the copy-forgery-inhibited pattern image, the printer driver 203 performs processing such as generating a copy-forgery-inhibited-pattern-image command as described below.

A layer determining unit 308 (shown in FIG. 3) is a module in the copy-forgery-inhibited-pattern-image processor 205 that executes an automatic determining process for determining copy-forgery-inhibited-pattern-image printing order in a second embodiment of the present invention.

Printing-Related Software Modules

Figure 3:
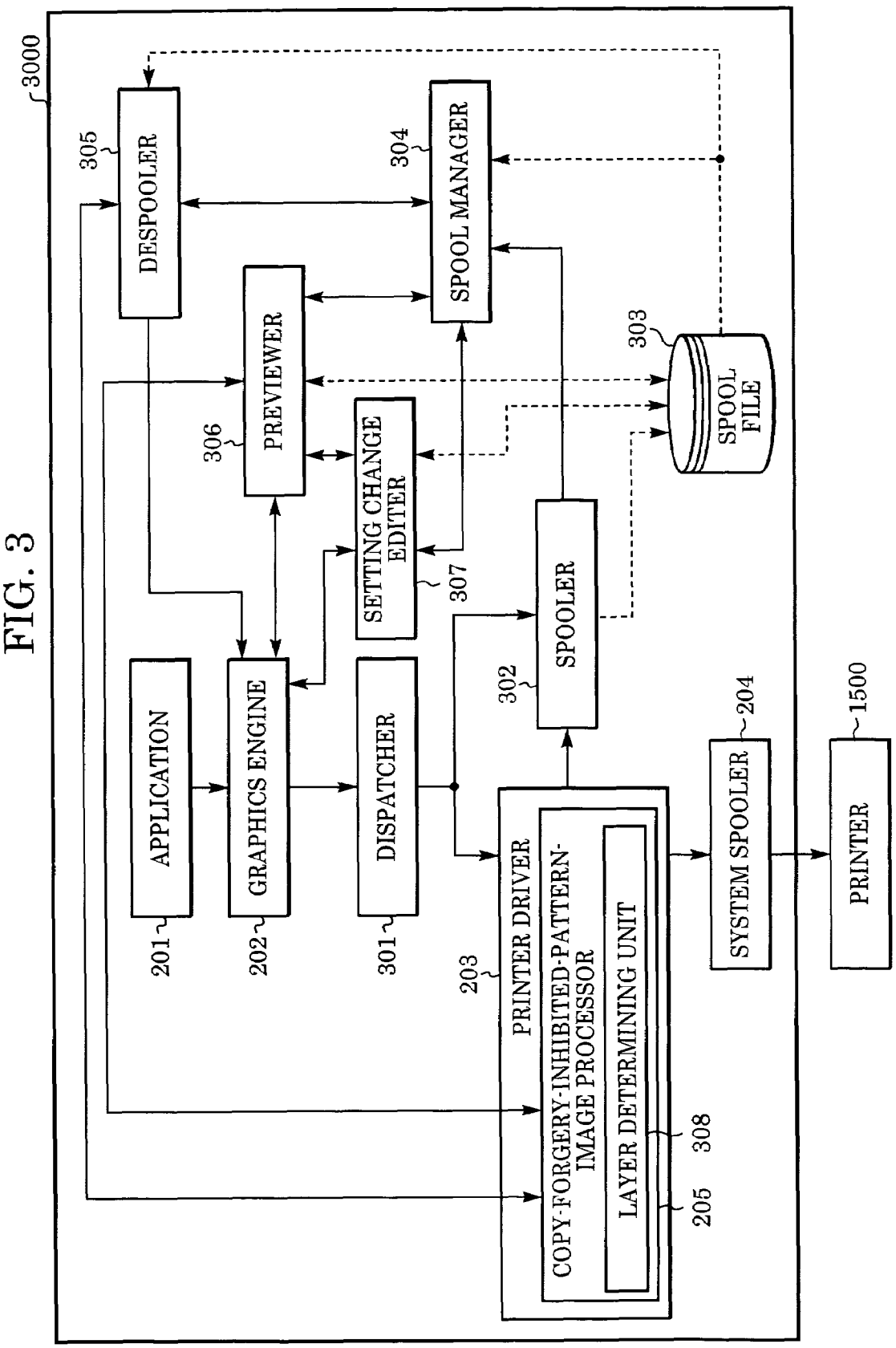
FIG. 3 is a block diagram illustrating another example of the printing-process configuration of the host computer 3000 shown in FIG. 1.

FIG. 3 is a block diagram showing another example of the printing process configuration in the host computer 3000. The printing process configuration shown in FIG. 3 is an expansion of the configuration shown in FIG. 2. In this configuration, when a printing command is sent from the graphics engine 202 to the printer driver 203, a spool file 303 composed of an intermediate code is temporarily generated. In the configuration shown in FIG. 2, the application 201 is released from the printing process at the time the printer driver 203 has transformed all printing commands from the graphics engine 202 into printer control commands. Unlike the configuration of FIG. 2, in the configuration shown in FIG. 3, the application 201 is released from the printing process at the time a spooler 302 has output, to a spool file 303, intermediate codes obtained by transforming all printing commands. Normally, the latter requires a shorter time than that required by the former. In addition, in the configuration in FIG. 3, the content of the spool file 303 can be processed. This realizes, for the printing data from the application 201, functions which are not provided in the application 201, such as enlargement and reduction in size, and reduction of plural pages into a one-page form for printing.

For these purposes, as compared to the configuration in FIG. 2, the configuration in FIG. 3 has an expanded system so that spooling is performed by using intermediate code data. In order to process the printing data, normally, processing is set up by using a window offered by the printer driver 203, and the printer driver 203 stores the setup data in the RAM 2 or the external memory 11.

Details of the configuration in FIG. 3 are described below.

As shown in FIG. 3, a dispatcher 301 receives the DDI function as the printing command from the graphics engine 202. When the printing command (DDI function) received by the dispatcher 301 from the graphics engine 202 is based on a printing command (GDI function) issued from the application 201 to the graphics engine 202, the dispatcher 301 loads, into the RAM 2, a spooler 302 stored in the external memory 11, and sends the printing command (DDI function) to the spooler 302 instead of the printer driver 203.

The spooler 302 analyzes the received printing command, converts the received printing command in units of pages into intermediate codes, and outputs the intermediate codes to a spool file 303. The spool file 303 containing the intermediate codes is called the "page description file (PDF)". In addition, the spooler 302 acquires, from the printer driver 203, processing conditions (e.g., N-up, two-sided printing, stapling, color/monochrome designation, etc.) concerning printing data which are set for the printer driver 203. The spooler 302 stores the acquired conditions as job-unit files in the spool file 303. The above configuration files stored in units of jobs are called the "spool description files (SDFs)", which are described later. Although the spool file 303 is created as a file in the external memory 11, it may be created in the RAM 2. The spooler 302 loads, into the RAM 2, a spool manager 304 stored in the external memory 11, and reports, to the spool manager 304, a creating status of the spool file 303. After that, the spool manager 304 determines whether printing can be performed based on processing conditions concerning printing data which are stored in the spool file 303.

When the spool manager 304 determines that printing can be performed by using the graphics engine 202, a despooler 305 stored in the external memory 11 is loaded into the RAM 2. The spool manager 304 instructs the despooler 305 to perform a control command generating process based on the intermediate-code page description file described in the spool file 303.

The despooler 305 processes the intermediate-code page description file described in the spool file 303 in accordance with a job configuration file, including processing setting information included in the spooler 302, re-generates a GDI function, and outputs the GDI function through the graphics engine 202 again. At this time, for generating a command concerning printing of a copy-forgery-inhibited pattern image, the copy-forgery-inhibited-pattern-image processor 205 is loaded for processing.

When the printing command received by the dispatcher 301 from the graphics engine 202 is based on the printing command (GDI function) issued from the despooler 305 to the graphics engine 202, the dispatcher 301 sends the printing command to the printer driver 203 instead of the spooler 302. Based on the DDI function acquired from the graphics engine 202, the printer driver 203 generates a printer control command in page description language or the like, and outputs the printer control command to the printer 1500 through the system spooler 204.

As shown in FIG. 3, a previewer 306 and a setting change editor 307 are also provided. These enable previewing, including previewing of a copy-forgery-inhibited pattern image, changing of printing conditions, and linkage of plural jobs. For previewing, changing of printing conditions, and linkage of plural jobs, first, in the Printer Properties shown in FIG. 8, which are described later, the user needs to designate the item "STORE" on a pull-down menu 901 for designating an output manner. For viewing only a preview picture, the user can selects the item "PREVIEW" as a designated output manner.

The conditions set in the Printer Properties are stored in a structure offered as a configuration file by the OS. The structure is called the "DEVMODE" in a Windows® OS. The structure includes a designation concerning whether to perform storage into the spool manager 304 while the processing conditions included in the spool file 303 are being configured. The spool manager 304 reads the processing conditions through the printer driver 203. When storage is designated, as described above, a page description file and a job configuration file are created and stored in the spool file 303. A pop-up window screen corresponding to the spool manager 304 is displayed, showing a list of jobs spooled in the spool file 303.

When a preview of a single job or linked jobs is designated on the window screen corresponding to the spool manager 304, the previewer 306 stored in the external memory 11 is loaded into the RAM 2, and the previewer 306 is instructed to perform previewing the job or jobs in intermediate code described in the spool file 303.

Storage of Intermediate Data for Printing

Figure 4:
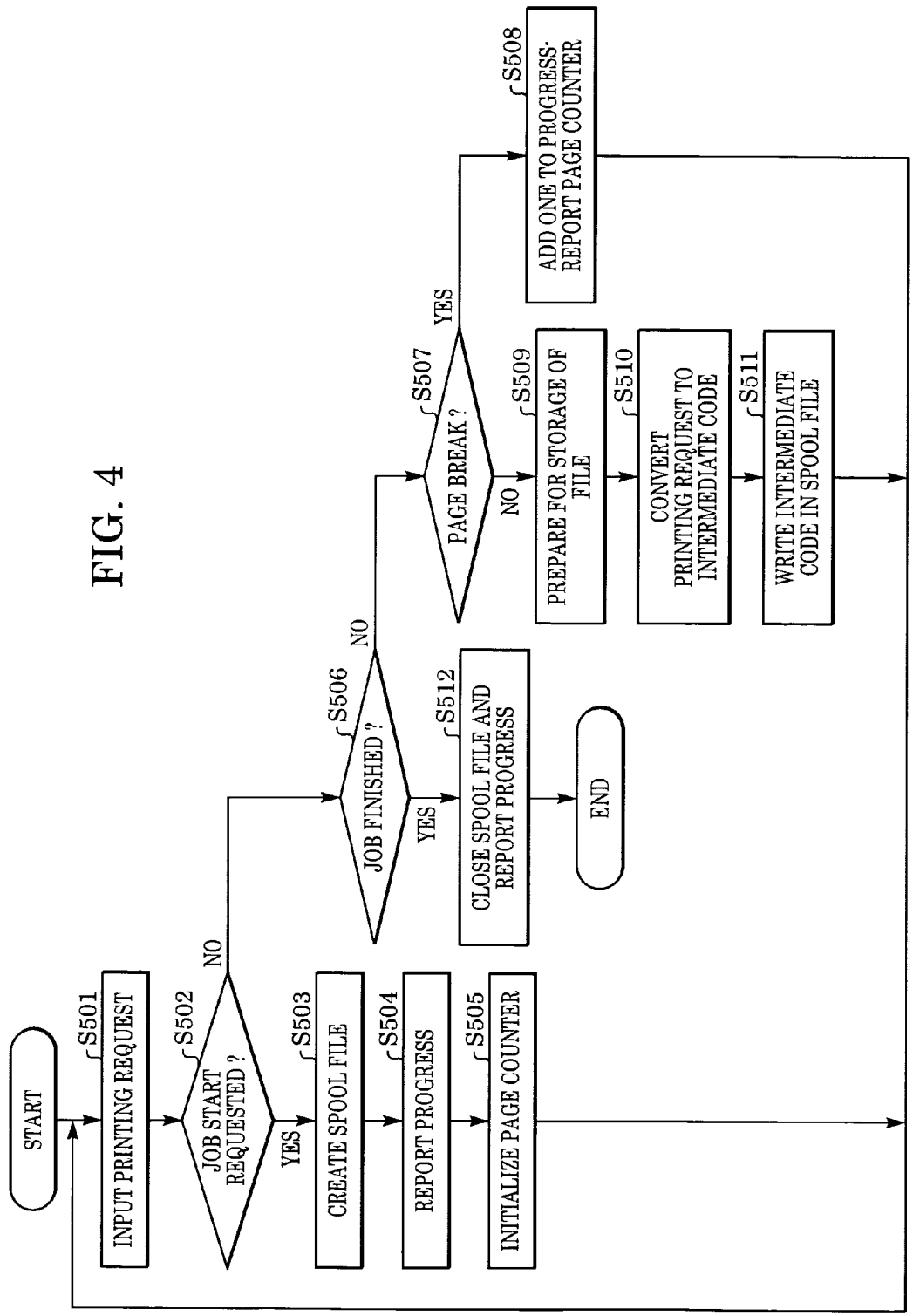
FIG. 4 is a flowchart illustrating a page-unit storage process of the spooler 302 shown in FIG. 3 in creating the spool file 303 shown in FIG. 3.

FIG. 4 is a flowchart illustrating page-unit storage in generating the spool file 303.

In FIG. 4, in step S501, the spooler 302 receives a printing request from the application 201 through the graphics engine 202. The graphics engine 202 displays the dialog screen shown in FIG. 7 for inputting printing conditions. The printing conditions are transferred from the printer driver 203 to the spooler 302. The dialog screen in FIG. 7 includes a condition 801 which sets the number of logical pages to be arranged on one physical page.

In step S502, the spooler 302 determines whether or not the received printing request is a job start request. If the spooler 302 determines in step S502 that the received printing request is the job start request, flow proceeds to step S503, where the spool file 303 is created for temporarily storing intermediate data.

In step S504, the spooler 302 reports the progress of printing process to the spool manager 304. In step S505, a page counter of the spooler 302 is initialized to one. From the spool file 303, information, such as job information and processing conditions concerning a job for which printing has started, is read and stored in the spool manager 304.

If, in step S502, the spooler 302 determines that the received printing request is not the jot start request, flow proceeds to step S506. In step S506, the spooler 302 determines whether the received printing request is a job finish request. If the spooler 302 determines that the received printing request is not the job finish request, flow proceeds to step S507, where a determination is made whether the printing request represents page breaking. If it is determined in step S507 that the printing request represents page breaking, flow proceeds to step S508, and progress of the printing process is reported to the spool manager 304. The page counter is incremented, the page description file storing the intermediate code is closed, and the next page description file is created.

If, in step S507, the spooler 302 determines that the printing request does not represent page breaking, flow proceeds to step S509, where preparation for writing an intermediate code in the page description file occurs.

Next, in step S510, in order to store the printing request in the spool file 303, the spooler 302 converts the DDI function as the printing request into an intermediate code. Then, in step S511, the spooler 302 writes the intermediate-code-form printing request, in a form capable of being stored in step S510, in the page description file of the spool file 303. After that, the spooler 302 returns to step S501 and receives the next printing request from the application 201. The above consecutive processing of steps S501 to S511 is continuously performed until the spooler 302 receives a job finish request form the application 201. In addition, the spooler 302 simultaneously acquires information, such as processing conditions, stored in the DEVMODE structure, and stores the acquired information as a job configuration file in the spool file 303.

Turning back to step S506, if the spooler 302 determines that the printing request represents a job finish, all the printing requests from the application 201 end. Accordingly, in step S512, the spooler 302 reports the progress of the printing process to the spool manager 304, and then its process ends.

Creation of Spool File

Figure 5:
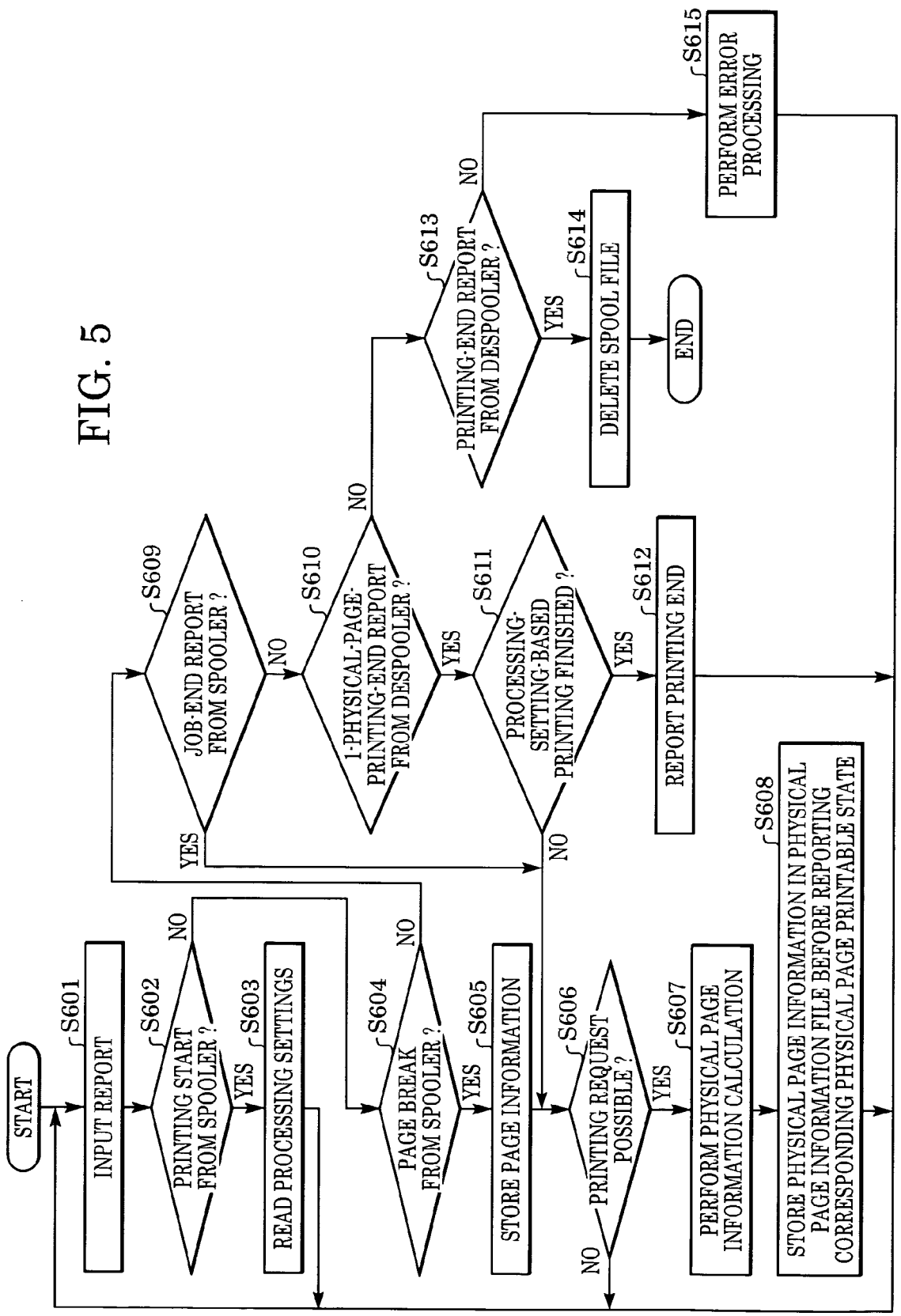
FIG. 5 is a flowchart illustrating details of control between the process of creating the spool file 303 shown in FIG. 3 and a printing data generating process (described later) in the spool file manager 304 shown in FIG. 3.

FIG. 5 is a flowchart illustrating details of control between a process of creating the spool file 303 in the spool manager 304 and a printing data generating process.

In step S601, the spool manager 304 receives a printing-process progress report form the spooler 302. In step S602, the spool manager 304 determines whether the progress report represents the progress (i.e., printing start) reported from the spooler 302 in step S504 of FIG. 4. If it is determined that the progress report represents the printing start, flow proceeds to step S603, where the spool manager 304 reads the processing conditions from the spool file 303 and starts job management.

If, in step S602, the spool manager 304 determines that the progress report does not represent the printing start, flow proceeds to step S604. In step S604, the spool manager 304 determines whether the progress report is the progress (i.e., one-logical-page printing-end report) reported from the spooler 302 in step S508 of FIG. 4. If the progress report is the one-logical-page printing-end report, the flow proceeds to step S605, where the logical page information corresponding to a corresponding logical page is stored.

Next, in step S606, the spool manager 304 determines whether printing of one physical page can be started for "n" logical pages whose spooling has ended at this time. If the printing can be started, the flow proceeds to step S607, where physical page number determination from logical pages assigned to one physical page to be printed is performed.

Regarding physical page calculation, for example, when the processing conditions indicate that four logical pages are disposed in one physical page, the first physical page becomes printable at the time the fourth logical page has been spooled, and is printed out. Next, the second physical page becomes printable at the time the eighth logical page has been spooled. If the total number of logical pages is not a multiple of the number of logical pages to be disposed in one physical page, the progress report (i.e., spool-end report) in step S512 of FIG. 4 can determine logical pages to be disposed in one physical page.

In step S608, information, such as logical page numbers constituting the printable physical page, and its physical page number, is stored in a job-output configuration file, including physical page information. The storage format is shown in FIG. 9. Addition to the physical page information for the amount of one physical page is reported to the despooler 305. After that, the process returns to step S601 and awaits the next report. In this embodiment, at the time printing data corresponding to one page, that is, logical pages constituting one physical page, have been spooled, the printing process can be performed even if printing-job spooling has not completely ended.

Returning to step S604, it has been determined that the progress report is not the one-logical-page printing-end report sent from the spooler 302, flow proceeds to step S609, where a determination is made whether the progress report is the job-end report from the spooler 302. When the progress report is the job-end report, flow proceeds to step S606. If the progress report is not the job-end report, the flow proceeds to step S610, where a determination is made whether the progress report is a one-physical-page-printing-end report from the despooler 305. When the progress report is a one-physical-page-printing-end report, flow proceeds to step S611, where it is determined whether all setting of the processing conditions has finished.

If the setting of the processing conditions has finished, the flow proceeds to step S612, and the end of printing is reported to the despooler 305. If the setting of the processing conditions has not yet finished, flow proceeds to step S606. In this embodiment, the despooler 305 presumes that one physical page is used as a printing process unit. In step S608, the information required for performing printing process for one physical page is sequentially stored in a reusable form. When the information is reusable, implementation may be performed in a form in which a high speed medium, such as a shared memory, is used to perform consecutive overwriting in units of physical pages so that speed and resources are saved. In addition, when the progress in the spooler 302 is faster than that in the despooler 305, or despooling starts after spooling all the pages, the number of times reporting is performed can reduced by reporting that plural physical pages or all the physical pages become printable in response to the progress in the despooler 305 without reporting a page-printable state for each physical page in step S608.

Returning to step S610, if it has been determined that the progress report is not the one-physical-page-printing-end report from the despooler 305, flow proceeds to step S613, where it is determined whether the progress report is a printing-end report from the despooler 305. If it is determined that the progress report is the printing-end report from the despooler 305, flow proceeds to step S614, where the spool manager 304 deletes a corresponding page description file in the spool file 303, and then the process ends. If the progress report is not the printing-end report from the despooler 305, flow proceeds to step S615, where other normal processing is performed and the spool manager 304 wait for the next report.

Output of Spool File

Figure 6:
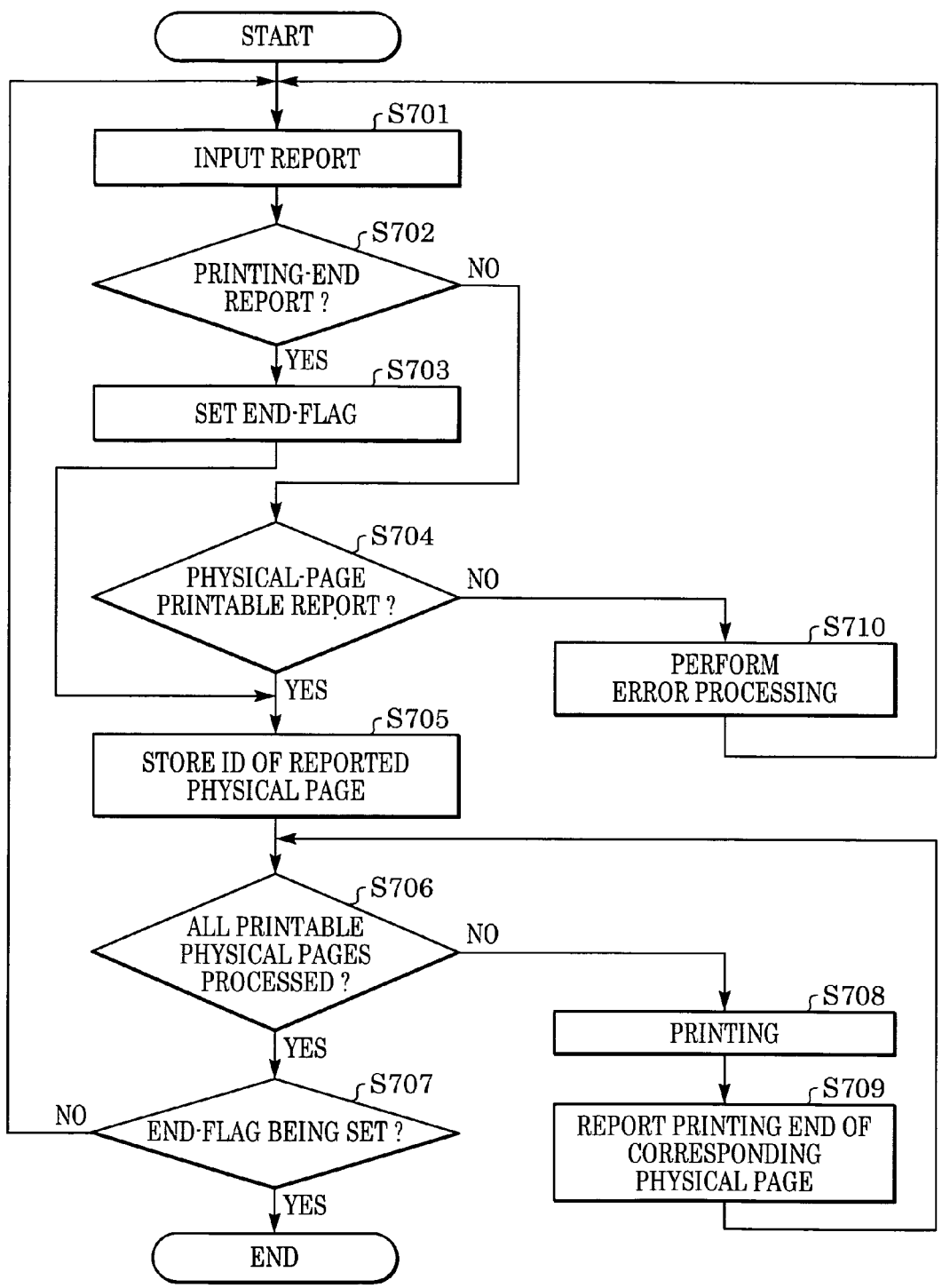
FIG. 6 is a flowchart illustrating details of the printing data generating process in the despooler 305 shown in FIG. 3.
Figure 7:
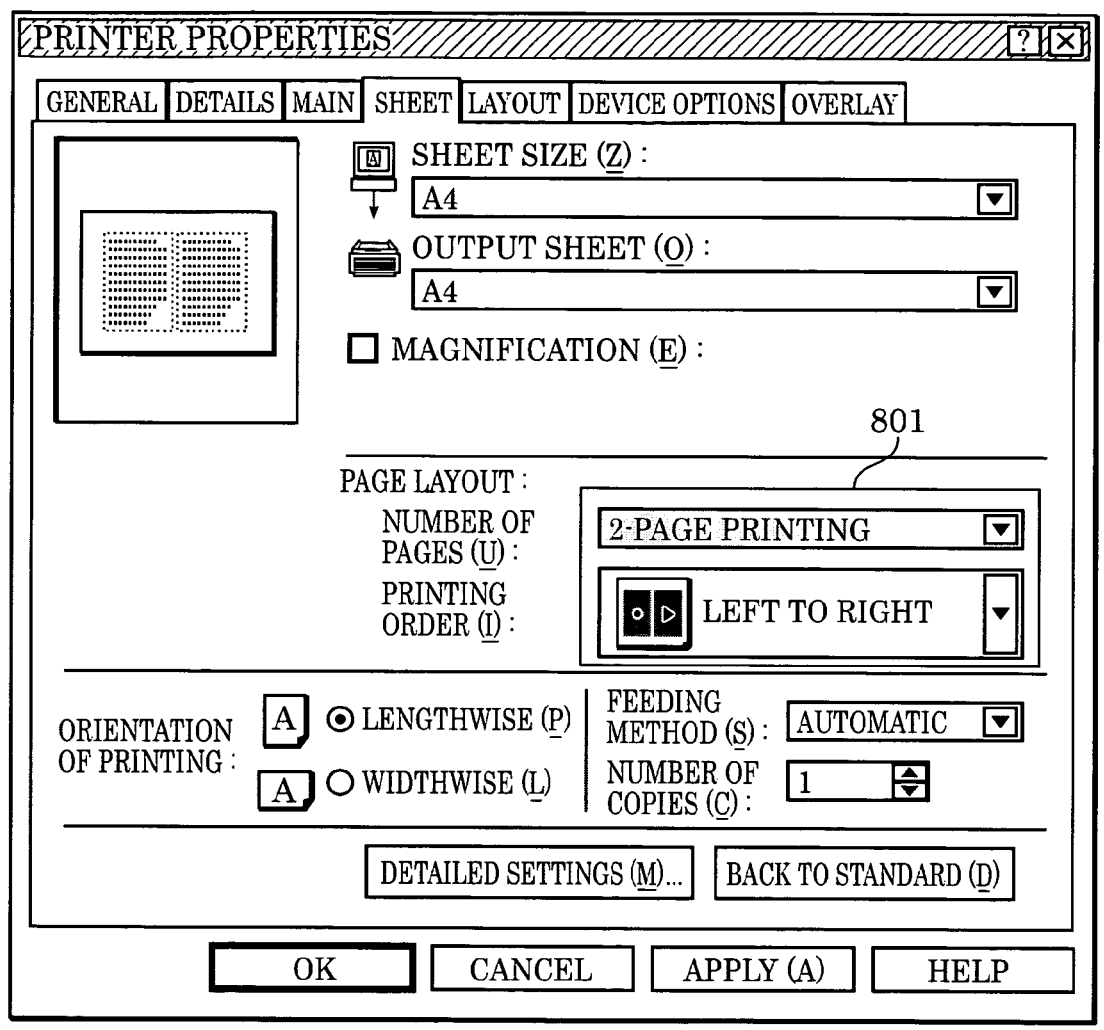
FIG. 7 is an illustration of an example of a printing-setting input-dialog screen.
Figure 8:
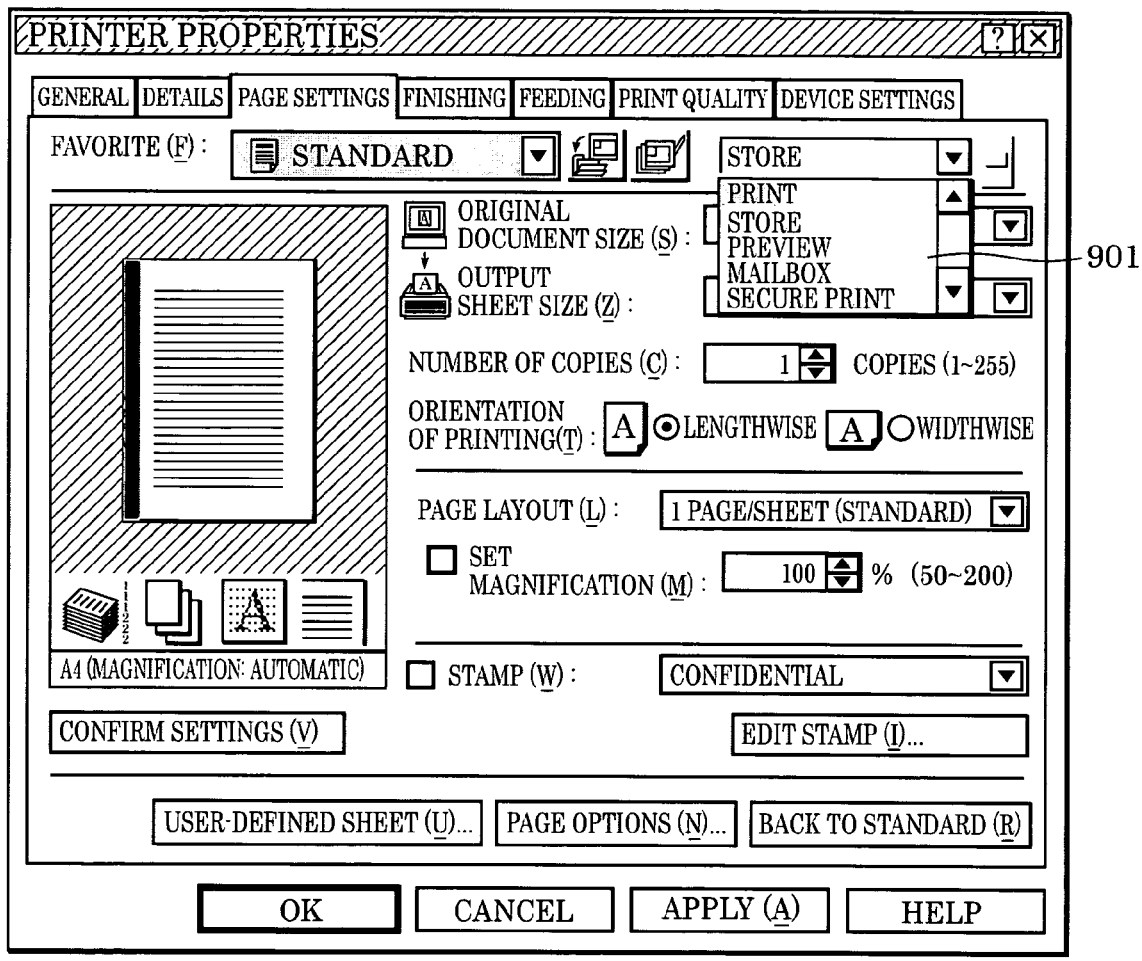
FIG. 8 is an illustration of an example of a setting screen for setting an output unit for a printing job.

FIG. 6 is a detailed flowchart illustrating a process for generating printing data in the despooler 305.

Briefly, in response to the printing request from the spool manager 304, the despooler 305 reads necessary information, such as the page description file and job configuration file and generates printing data. A method of transfer of the generated printing data is identical to that described in FIG. 3. In addition, the printing data is based on the PDL, as described above.

In more detail, in step S701, the progress report from the spool manager 304 is input for generating the printing data. In step S702, the despooler 305 determines whether the input report is a job-end report. If the input report is the job-end report, flow proceeds to step S703, and an end flag is set before proceeding to step S705. If the despooler 305 determines in step S702 that the input report is not the job-end report, flow proceeds to step S704, where it is determined whether a request to start printing of the one physical page in step S608 of FIG. 5 has been reported. If it is determined that the input report is not the job-end report, flow proceeds to step S710, where other error processing is performed. Flow then returns to step S701, where the despooler 305 awaits the next report.

If, in step S704, it is determined that the request to start printing of the one physical page in step S608 of FIG. 5 has been reported, flow proceeds to step S705, where the ID of the printable physical page reported in step S704 is stored.

Next, in step S706, a determination is made whether the printing process has been performed for all pages corresponding to the physical page IDs stored in step S705. If the printing process has been performed, flow proceeds to step S707, where it is determined whether the end flag has been set in step S703. When the end flag is on, the despooler 305 determines that printing for the job has ended, and reports to the spool manager 304 a report of termination of the process of the despooler 305 before ending its process. If it is determined that the end flag has not been set, flow returns to step S701, where the despooler 305 awaits the next report.

Returning to step S706, if it has been determined that printable physical pages remain, flow proceeds to step S708. In step S708, the despooler 305 performs printing by sequentially reading the IDs of unprocessed physical pages from the stored physical page IDs, and acquiring the information required for generating printing data of physical pages corresponding to the read physical page IDs. In the printing process, the despooler 305 converts the printing request command stored in the spool file 303 into a form (GDI function) recognizable by the graphics engine 202, and transfers the command in the converted form. Regarding processing setting (hereinafter referred to as "N-page printing") for disposing a plurality of logical pages in one physical page, in this step, the conversion is performed when considering arrangement in reduced size.

After the printing process ends, in step S709, the despooler 305 reports, to the spool manager 304, the end of generation of one-physical-page printing data. Flow then returns to step S706, where the despooler 305 repeats printing until the physical pages corresponding to the printable-physical-page IDs stored in step S705 are printed.

The flow of the printing process using the dispatcher 301, the spooler 302, the spool manager 304, and the despooler 305 has been described. The above printing process releases the application 201 from the application 201 at the time the spooler 302 generates and stores the intermediate code in the spool file 303. Thus, the printing process can finish in a shorter time than direct output of printing data to the printer driver 203. The spool file 303 temporarily stores intermediate files, like the page description file and the job configuration file, considered the printing conditions for the printer driver 203. Accordingly, this enables the user to recognize a preview of an image to be actually printed out. In addition, storage of the intermediate files enables linkage and rearrangement of printing jobs generated by a plurality of applications. Accordingly, also in the case of changing the printing conditions, printing jobs can be executed without launching an application.

In the printing process using the spooler 302, a job-output setting file is created when requesting the graphics engine 202 to perform printing. In addition, also in the case of previewing and job linkage, etc., job-output setting file is created. The job-output setting file is equivalent to the job configuration file in the case of a single job. In the case of linked jobs, the job-output setting file is created based on plural pieces of job configuration information. The job-output setting file is described below.

Configuration of Job-output Setting File

FIG. 9 shows an example of a job-output setting file storing information forming printable physical pages generated by the spool manager 304. A field 1001 is an ID for identifying a job, and can store the ID in the form of the name of a file or shared memory storing the ID. A field 1002 is job-setting information. The job setting information includes only one set of information that can be set for one job, such as the structure required for the graphics engine 202 to start job printing, designation of N-page printing, designation of additional drawing, such as a page frame, the number of copies, and designation of finishing such as stapling. The job-setting information field 1002 stores only the information required for functions for the job. A field 1003 stores the number of physical pages of the job and indicates that pieces of physical page information are stored from the next field in proportion to the number of physical pages. Since this embodiment reports the number of printable physical pages, the field 1003 is not essential for operation. After the field 1003, the pieces of physical page information, which number is represented by the number in the field 1003, is stored from the field 1004 to the last field 1007. The physical page information is described with reference to FIG. 12.

FIG. 10 shows an example of the job-setting information shown in the field 1002 of FIG. 9. A field 1101 represents the total number of physical pages. A field 1102 represents the total number of logical pages. The fields 1101 and 1102 are used for cases such as printing additional information, like the number of pages, in addition to printing data. While printing is continuously performed, both fields store provisional values. Alternatively, until the printing ends, the spool manager 304 delays generation of printable physical pages. A field 1103 stores number-of-copies information designating the number of copies to be printed in the job. A field 1104 is used to designate the number of units, each unit consisting of plural copies, when the number of copies is set to be plural in the field 1103. A field 1105 represents finishing information, such as stapling, punching, and Z-folding. The finishing information is designated when a finisher is provided, for example, in the printer 1500. A field 1106 stores additional printing information, which is to be added to the job, such as printing of a copy-forgery-inhibited pattern image of the present invention, a page frame, date, user name, number of pages, and watermarks. The number of fields included in the job-setting information increases in proportion to the increase in the number of functions. For example, when two-sided printing can be performed, a field storing designation of two-sided printing is added.

FIG. 11 shows an example of the physical page information in the field 1004. In FIG. 11, the first field 1201 represents a physical page number. The physical page number is a value for use in managing printing order and in additional printing of a physical page. A field 1202 stores physical-page-setting information representing a layout and color/monochrome designation when a layout and color/monochrome designation are settable for each physical page. A field 1203 represents the number of logical pages to be assigned to the physical pages. For example, when four logical pages are assigned to one physical page, the number four or an ID representing four for printing is stored in the field 1203. In a field 1204 and the subsequent fields 1205-1207, pieces of logical page information, whose number is represented by the number designated in the field 1203, is stored. Depending on the number of printed pages from the application 201, the number of data items of actual pages may be smaller than the number of pages designated in the field 1203. For coping with such a case, special data representing blank pages is added to the logical page information.

Figure 12:
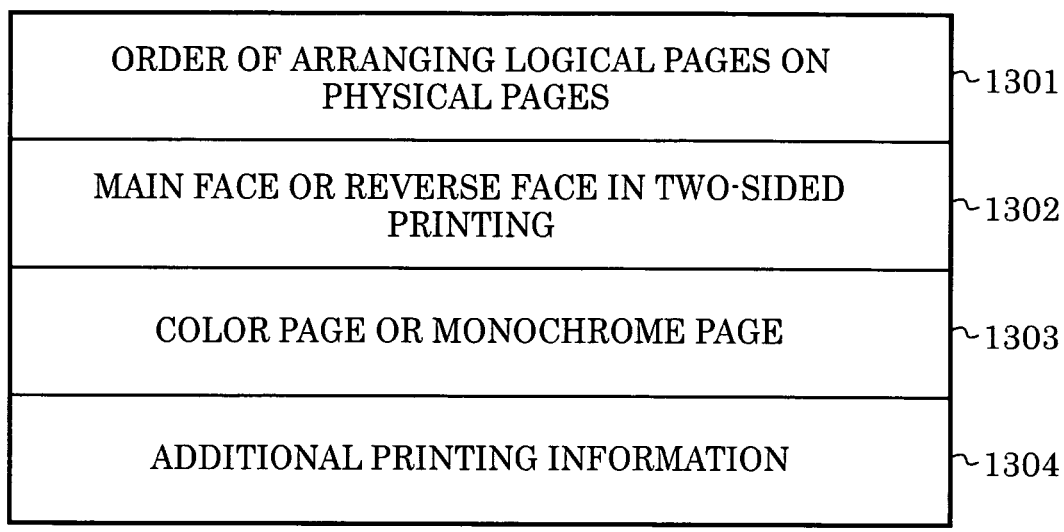
FIG. 12 is an illustration of an example of physical page setting information in the field 1202 shown in FIG. 11.

FIG. 12 shows the physical-page-setting information in the field 1202. A field 1301 stores the order of arranging logical pages on physical pages which represents designated order (e.g., upper left to side, upper left to bottom) in N-page printing of arranging logical pages on physical pages. Depending on the system, by using the order in accordance with the arrangement order, and not the order of page numbers, as the order of pieces of logical page information, the setting in the field 1301 may be performed. A field 1302 represents front-back side information in two-sided printing and is used for, as an example, arranging binding margins on both sides. A field 1303 represents designation of a color page or monochrome page. When the printer 1500 has monochrome and color modes, in a document having a mixture of color pages and monochrome pages, the field 1303 is used to print the color pages in color mode and to print the monochrome pages in monochrome mode. A field 1304 represents additional printing information, and is used to print, on each physical page, additional information such as the number of pages and a date. Also in the case of the physical-page-setting information, fields are added in proportion to an increase in the number of functions of the system.

In this embodiment, a copy-forgery-inhibited pattern image described with reference to FIG. 14 and thereafter is information to be added to a physical page. Thus, based on the additional printing information (i.e., information concerning copy-forgery-inhibited-pattern-image printing) in the field 1106, the information to be added is also stored as setting information for each physical page in the field 1304. An example of a data format for storing setting information, in the additional printing information in the field 1106 and the additional printing information in the field 1304, concerning copy-forgery-inhibited-pattern-image printing is described later with reference to FIG. 14.

Figure 13:
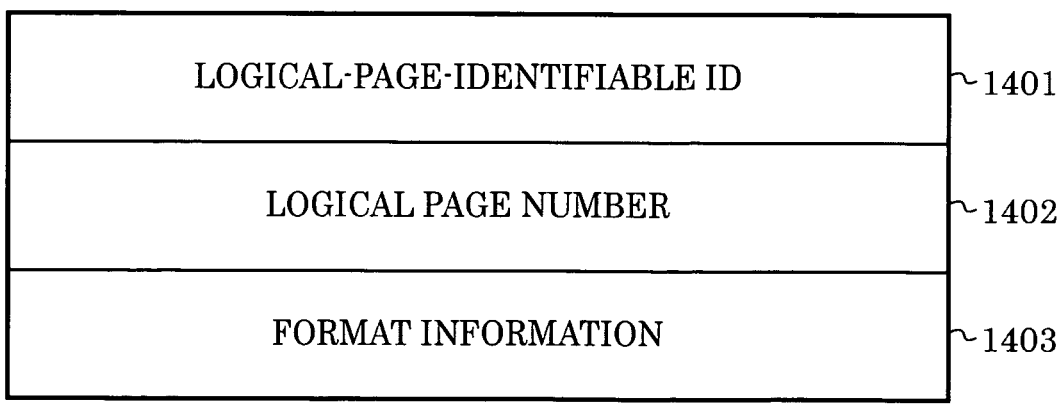
FIG. 13 is an illustration of an example of a data format for use in requesting the despooler 305 to perform physical page printing by the spool file manager 304.

FIG. 13 shows an example of the logical-page information in the field 1204. A field 1401 represents the ID of a logical page. By using this ID, the spool file 303 refers to the intermediate code in a page description file corresponding to the logical page. The intermediate code of the logical page only needs to be accessed by using this ID. Even in the case of a file or memory pointer, it is only required that a logical-page forming intermediate code be included in the file or memory pointer. A field 1402 represents a logical page number. The logical page number is used to print it as additional information, or is used as auxiliary information for a logical page ID. Format information in a field 1403 contains various setting items which can be designated in units of logical pages. For example, the field 1403 stores various setting information such as additional printing information like page frame and magnification. In addition, the field 1403 can store attribute information for a logical page, such as logical-page-unit color/monochrome information, if needed. Conversely, in a system that does not need switching of settings in units of logical pages and attribute information in units of logical pages, the field 1403 is unnecessary.

The job-output setting file has the above configuration. The job configuration file is almost similar in construction to the job-output setting file. The job configuration file includes, for each job, a printing format (e.g., one-sided printing, two-sided printing, or binding printing), a printing layout (e.g., N-up, poster printing), additional information (e.g., copy-forgery-inhibited-pattern-image printing-information, a watermark, a date, a user name, etc.), the number of copies, and sheet-size information. For each physical page, the order of arranging logical pages, designation of one of two sides to be printed, a color mode, etc., are set.

FIG. 3 also shows the setting change editor 307, which has a job setting changing function in addition to the expanded system, which has been described. The setting change editor 307 can interactively change the contents of the above job configuration file or job-output setting file. The setting change editor 307 is not described since it does not directly relate to the present invention.

Description of Copy-Forgery-Inhibited-Pattern-Image Printing Process

One embodiment of the present invention is directed to a selecting configuration in which transparent printing or overlay printing of a copy-forgery-inhibited pattern image can be arbitrarily selected by the user. Specifically, by selecting either the transparent printing or the overlay printing through the user interface shown in FIG. 16A, which includes radio buttons for selecting transparent printing or overlay printing, a user is able to set the final overlay order between copy-forgery-inhibited-pattern-image data and printing image data (document data). In response to setting the order, transparent printing of a copy-forgery-inhibited pattern image or overlay printing of a copy-forgery-inhibited-pattern image is performed. Details of the transparent printing and the overlay printing are described below with respect to FIG. 17 and FIG. 19 respectively.

Figure 15:
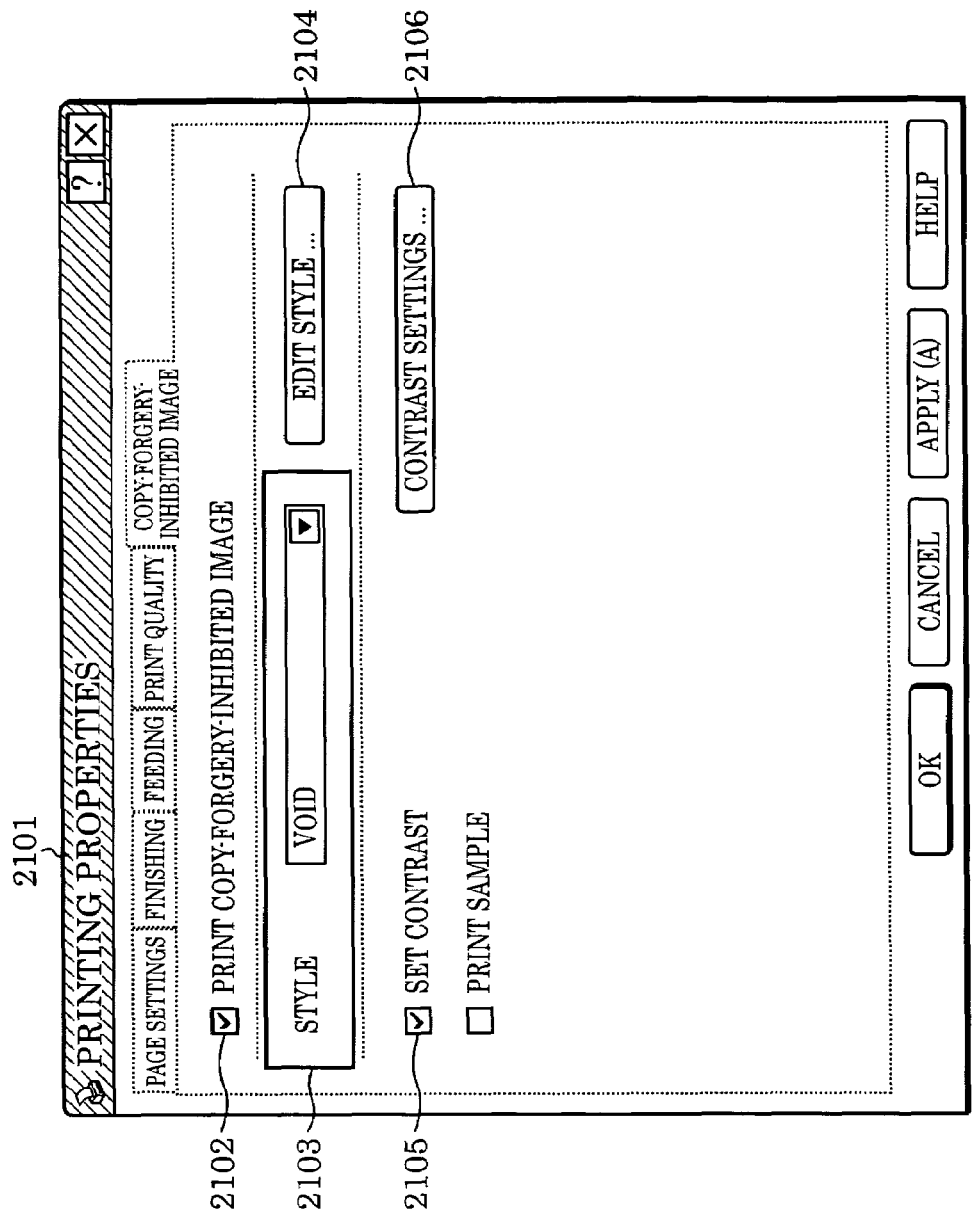
FIG. 15 is an illustration of an example of a setting screen for setting a copy-forgery-inhibited-pattern-image printing function.
Figure 16A:
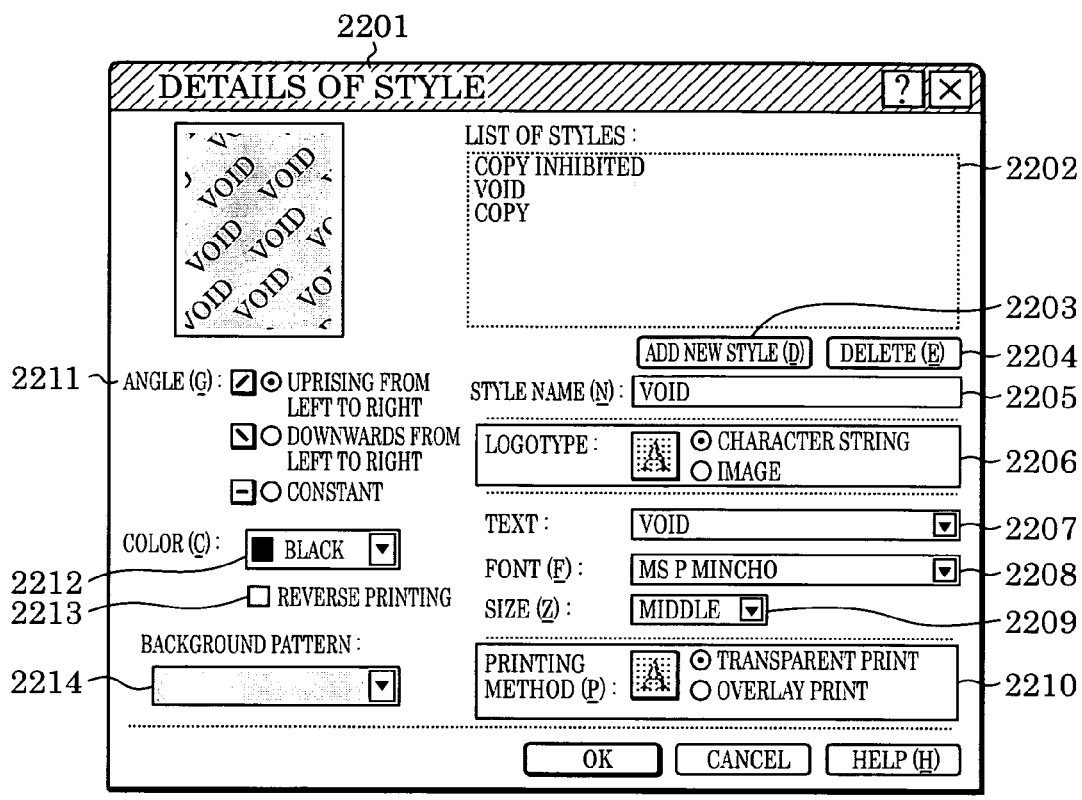
FIG. 16 is an illustration of a dialog screen for editing detailed settings of copy-forgery-inhibited-pattern-image printing.
Figure 16B:
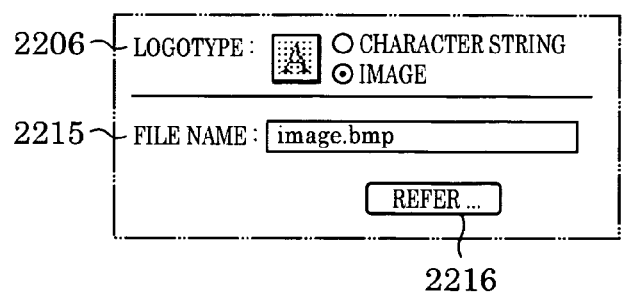

FIG. 15, and FIGS. 16A and 16B depict examples of a user interface for setting copy-forgery-inhibited-pattern-image printing.

FIG. 15 is an example of an initial screen of a user-interface concerning copy-forgery-inhibited-pattern-image printing. The user interface is provided by the printer driver 203. In this example, copy-forgery-inhibited-pattern-image printing is set-up via a property sheet 2101.

A check box 2102 is used select whether to perform copy-forgery-inhibited-pattern-image printing (i.e., printing including printing of a copy-forgery-inhibited pattern image) for a printing job. This selection is stored, as designation of whether copy-forgery-inhibited-pattern-image printing is to be performed, in the additional printing information field 1106 of FIG. 10. A style information box 2103 indicates style information enabling one identifier (style) to designate plural pieces of setting information of copy-forgery-inhibited-pattern-image printing. The printer driver 203 can select a plurality of styles. The relationship between each style and copy-forgery-inhibited-pattern-image printing information is registered in a registry. Selection by a user of a button 2104 results in a display of the style editing dialog screen 2201 shown in FIG. 16A. A check box 2105 is used to adjust the contrast between a foreground and a background in the copy-forgery-inhibited-pattern-image printing. A user's selection of a button 2106 results in display of a contrast setting screen (not shown).

FIG. 16A shows an example of a dialog screen for editing detailed settings for copy-forgery-inhibited-pattern-image printing.

In FIG. 16A, the style editing dialog screen 2201 displays, for a preview, a copy-forgery-inhibited pattern image generated based on copy-forgery-inhibited-pattern-image information. An area 2202 is used to display a list of styles in the style information box 2103 of FIG. 15. The user can use buttons 2203 and 2204 to add a new style and to delete a style. An area 2205 is used to display the name of a style being currently designated.

Radio buttons 2206 are used to select a drawing object type for use in copy-forgery-inhibited-pattern-image printing. By operating the radio buttons 2206 to select the item "CHARACTER STRING", a text object is used. By selecting the item "IMAGE", image data typified by BMP or the like is used. Since the item "CHARACTER STRING" is selected in the example shown in FIG. 16A, in the style editing dialog screen 2201, setting items 2207 to 2209 concerning the text object are displayed in editable form. When the item "IMAGE" is selected in the area 2206, the setting items 2207 to 2209 are not displayed. Instead, the image-file-name indication 2215 and button 2216 in FIG. 16B are displayed. Button 2216 is used to display a file selecting dialog screen (not shown).

The item 2207 is a field for displaying and editing a character string to be used as a copy-forgery-inhibited pattern image. The item 2208 is a field for displaying and editing font information of character string. In this embodiment, only font names are selectable. However, typeface family information (e.g., bold, italic, etc.), and ornamental character information, etc., may be selectable. The item 2209 is a field for displaying and editing the font size of the character string to be used as a copy-forgery-inhibited pattern image. Although this embodiment presumes that three levels, "Large", "Middle", and "Small", are selectable, font-size designation, which is commonly used, may be employed, such as direct input of a point size. Radio buttons 2210 are used to set the order of printing a copy-forgery-inhibited pattern image and document data. When the item "Transparent Print" is selected, a copy-forgery-inhibited pattern image is drawn first in a bitmap memory of the printer 1500, and document data is drawn second so as to overwrite the copy-forgery-inhibited pattern image. When the item "Overlay Print" is selected, the document data is drawn first, and the copy-forgery-inhibited pattern image is drawn second so to overwrite the document data.

Radio buttons 2211 are used to designate an angle for arranging the copy-forgery-inhibited pattern image.

Although, in this embodiment, the three angles, "Uprising from Left to Right", "Downwards from Left to Right", and "Constant" are selectable, the angle designation may be expanded by providing a numeric input field for arbitrarily designating an angle, a slider bar for intuitively designating an angle, or the like. A field 2212 is used to designate a color for use in displaying the copy-forgery-inhibited pattern image, i.e., a foreground pattern and a background pattern). A check box 2213 is used to switch the foreground pattern and the background pattern. When the check box 2213 is not checked, printing is performed so that the foreground pattern becomes visible on a copy in the process of copying. When the check box 2213 is checked, printing is performed so that the background pattern becomes visible in the process of copying and the foreground pattern has a voided form.

A field 2214 is used to designate a camouflage image for making it difficult to recognize a copy-forgery-inhibited pattern image embedded in the original document. The camouflage image is selectable from among a plurality of pattern images. In addition, an option of using no camouflage image is provided.

Data Format of Copy-Forgery-Inhibited-Pattern-Image Printing-Setting Information Next, additional information concerning the copy-forgery-inhibited-pattern-image printing-setting information and its data format are described with reference to FIG. 14.

Referring to FIG. 14, a field 2001 stores a value representing the type (text or image) of the drawing object to be generated in the copy-forgery-inhibited-pattern-image printing as designated in field 2206 of FIG. 16A. A field 2002 stores setting information for a drawing object in the field 2001, where the information is generated by the fields 2207 to 2290 shown in FIG. 16A or in the screen shown in FIG. 16B. When the text is selected, a character string, a font name, and size information are stored. When the image is selected, the location of a file of an image to be input is stored. A field 2003 stores information defining the order of printing the copy-forgery-inhibited pattern image for the document data as designated in the field 2210 of FIG. 16A. A field 2004 stores angle information) for drawing-object arrangement as designated in the field 2211 of FIG. 16A. A field 2005 stores information representing the color for use in the copy-forgery-inhibited pattern image (i.e., the foreground pattern and the background pattern) as designated in the field 2212 of FIG. 16A. A field 2006 stores the information designated in the check box 2213 of FIG. 16A. A field 2007 stores the pattern additional information concerning the camouflage image designated in the field 2214 of FIG. 16A. A field 2008 stores density information of the foreground pattern, and a field 2009 stores density information of the background pattern.

Process for Generating Printing Data of Copy-Forgery-Inhibited Pattern Image

Figure 17:
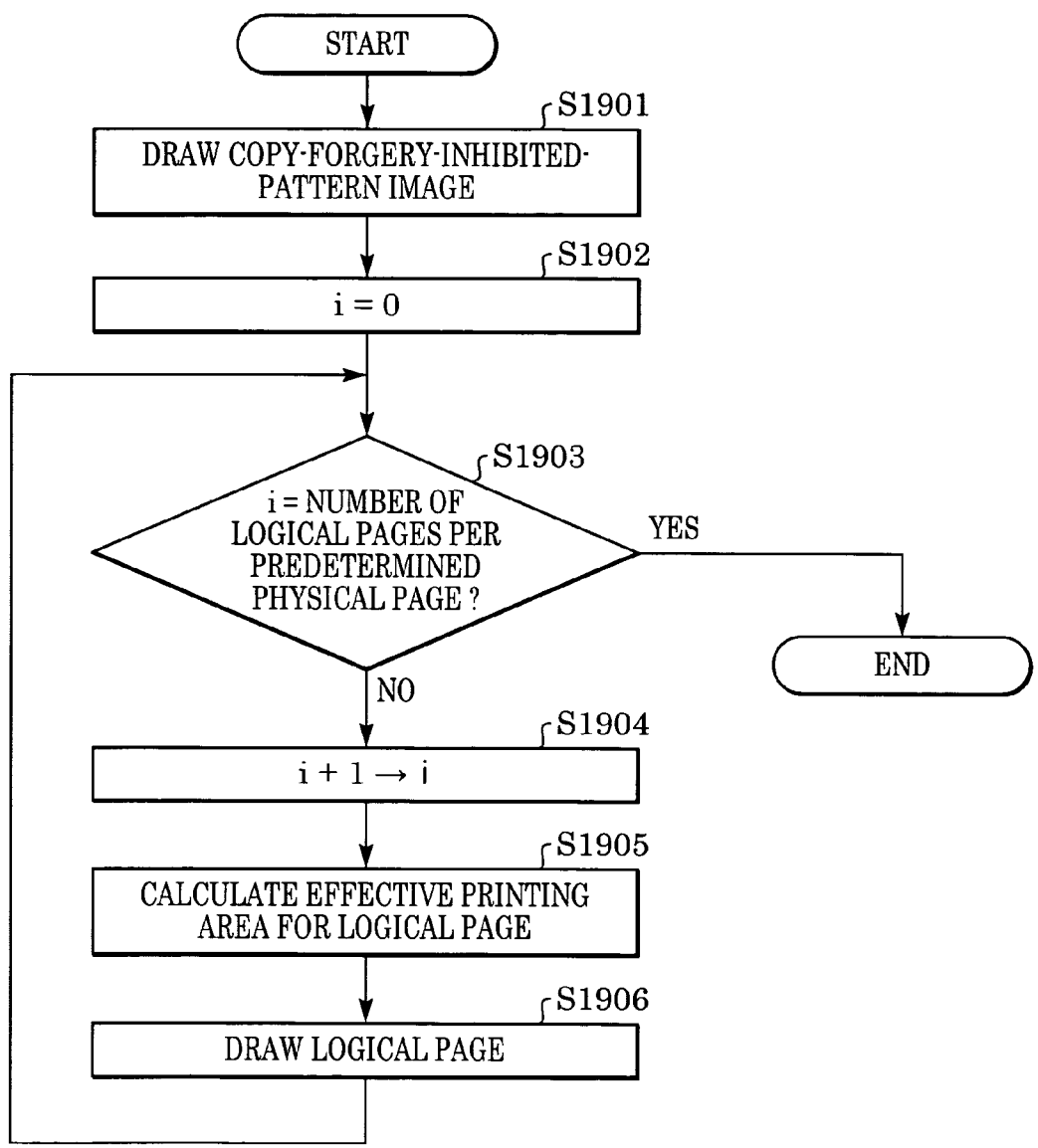
FIG. 17 is a flowchart illustrating an example of a copy-forgery-inhibited-pattern-image drawing process.
Figure 18:
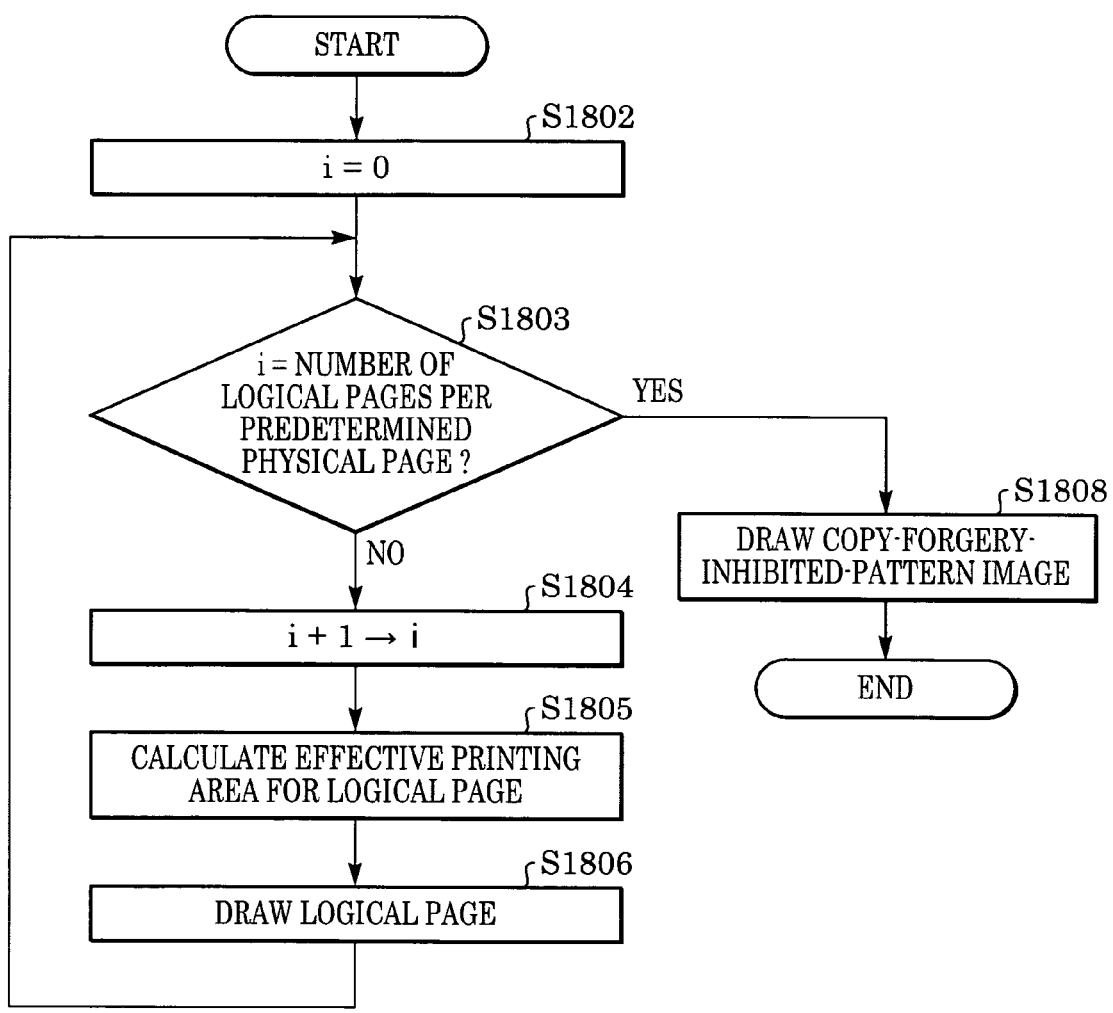
FIG. 18 is a flowchart illustrating another example of the copy-forgery-inhibited-pattern-image drawing process.

FIGS. 17 and 18 are flowcharts illustrating a process, in copy-forgery-inhibited-pattern-image printing, for generating printing data of a copy-forgery-inhibited pattern image. FIGS. 17 and 18 correspond to the "transparent printing" and "overlay printing" described with reference to FIG. 16A, respectively. The processes shown in FIGS. 17 and 18 are performed in the printing process in step S708 shown in FIG. 6, that is, the course of the printing data generating process.

First, transparent printing, that is, the case of generating printing data of a copy-forgery-inhibited pattern image, is described below with reference to the flowchart shown in FIG. 17.

As described above, transparent printing rasterizes document data on copy-forgery-inhibited-pattern-image data in the bitmap memory of the printer 1500. Accordingly, regarding the order of generating the printing data, printing data of the copy-forgery-inhibited pattern image needs to be generated before generating printing data corresponding to the document data.

Turning to FIG. 17, in step S1901, based on the copy-forgery-inhibited-pattern-image information, the copy-forgery-inhibited-pattern-image processor 205 generates a copy-forgery-inhibited-pattern-image. Details of the generation are described below with reference to FIG. 19. Next, in step S1902, a counter is initialized. Then, in step S1903, it is determined whether the counter value has reached a predetermined number of logical pages per physical page. When the counter value is equal to the predetermined number of logical pages, the flow ends. When the counter value is not equal, the process proceeds to step S1904. In step S1904, the counter value is incremented by one. In step S1905, based on the number of logical pages per physical page, an effective printing area for logical pages to be subject to the printing-data generating process is calculated. Next, in step S1906, from the physical page information reported in the form shown in FIG. 8, the present logical page number is read with the counter value as an index, and a corresponding logical page is reduced to fall within the effective printing area. However, N-page printing is not designated, therefore, reduction is not necessary.

Next, overlay printing, that is, the case of generating the printing data of the document data first, is described below with reference to the flowchart shown in FIG. 18.

As described above, overlay printing rasterizes the copy-forgery-inhibited pattern image on the document data in the bitmap memory of the printer 1500. Accordingly, regarding the printing data generating order, printing data corresponding to the document data needs to be generated before generating printing data corresponding to the copy-forgery-inhibited pattern image.

Turning to FIG. 18, in step S1802, the counter is initialized. In step S1803, it is determined whether the counter value has reached a predetermined number of logical pages per physical page. When the counter value is equal to the predetermined number of logical pages, the process proceeds to step S1808. In step S1808, the copy-forgery-inhibited-pattern-image processor 205 generates the copy-forgery-inhibited pattern image in accordance with the copy-forgery-inhibited-pattern-image information shown in FIG. 14, based on the effective printing area for physical page which is acquired from the application 201. Details of the generation are described later with reference to FIG. 19.

When the counter value is not equal, the process proceeds to step S1804. In step S1804, the counter value is incremented by one. In step S1805, based on the number of logical pages per physical page and the counter value, an effective printing area for logical pages to be generated is calculated. In step S1806, from the physical page information in the form shown in FIG. 8, the present logical page is read with the counter value as an index, and a corresponding logical page is reduced to fall within the effective printing area. However, when N-page printing is not designated, reduction is not necessary.

Figure 19:
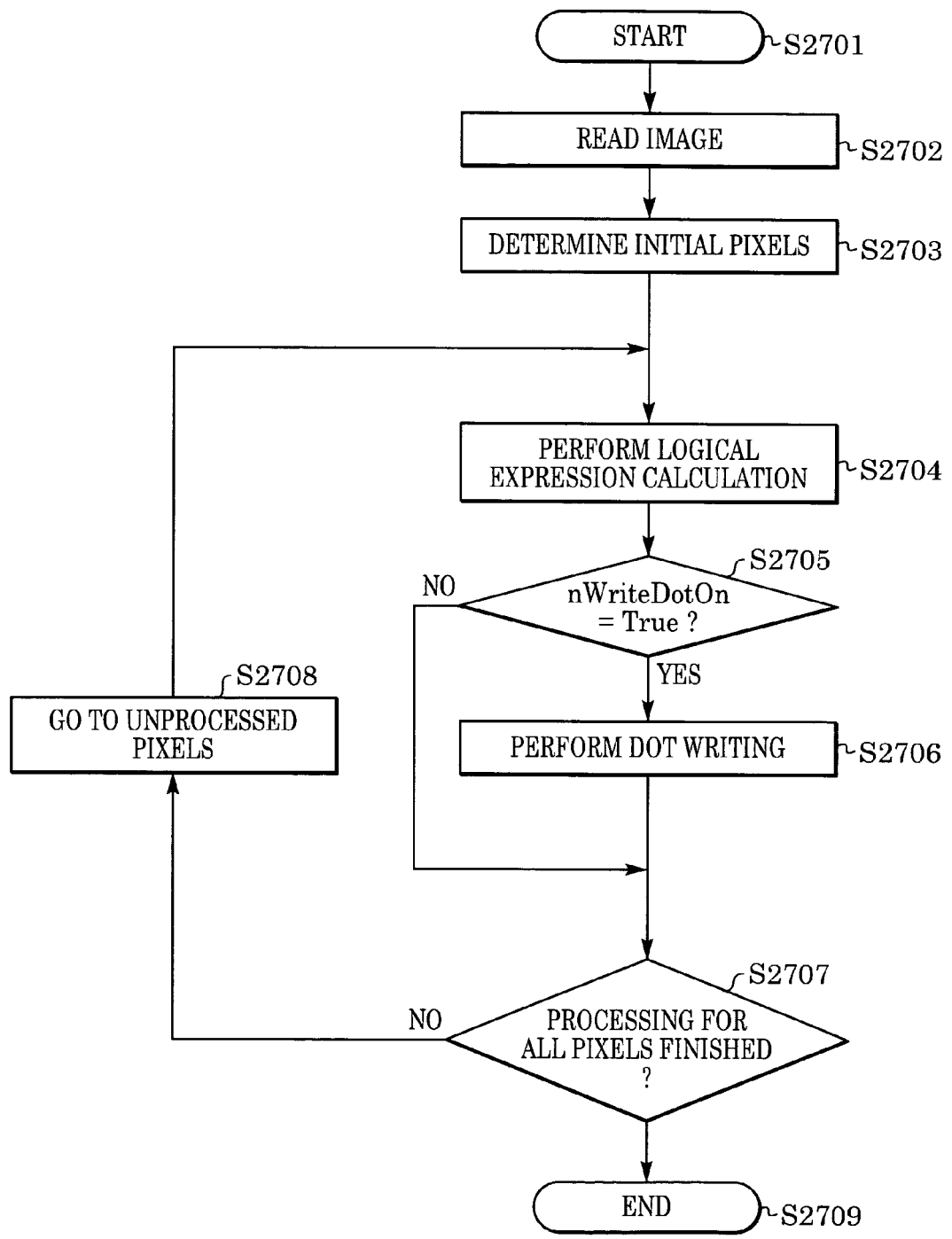
FIG. 19 is a flowchart illustrating a generating process in the copy-forgery-inhibited-pattern-image drawing process.

FIG. 19 is a detailed flowchart illustrating the copy-forgery-inhibited-pattern-image generation in step S1901 of FIG. 17 and the copy-forgery-inhibited-pattern-image generation in step S1808 of FIG. 18.

In step S2701, the copy-forgery-inhibited-pattern-image generating process is started. Specifically, a copy-forgery-inhibited-pattern-image generating instruction and copyforgery-inhibited-pattern-image printing information are input to the copy-forgery-inhibited-pattern-image processor 205. Next, in step S2702, the copy-forgery-inhibited-pattern-image processor 205 reads a foreground threshold pattern, a background threshold pattern, a basic image, and a camouflage image. The basic image is image data used as a basis for generating the copy-forgery-inhibited pattern image. Preferably, the basic image is set as copy-forgery-inhibited-pattern-image blocks, which are described below. In addition, the basic image is generated by the despooler 305 based on various types of setting information.

In step S2703, the copy-forgery-inhibited-pattern-image processor 205 determines initial pixels for use in generating the copy-forgery-inhibited pattern image. For example, when the copy-forgery-inhibited-pattern image is generated by performing image processing in raster scanning order on an entire A4-size printable area from its top left to bottom right, the top left of the printable area is used as an initial position. In this case, the printable area is equal to a copy-forgery-inhibited-pattern-image area.

In step S2704, the copy-forgery-inhibited-pattern-image processor 205 executes tiled-form arrangement of the background threshold pattern, the foreground threshold pattern, the basic image, and the camouflage image from the top left of the copy-forgery-inhibited-pattern-image area by performing calculation based on the following expression:

$$\text{nWriteDotOn} = \text{nCamouflage} \times (\text{nSmallDotOn} \times \neg\text{nHiddenMark} + \text{nLargeDotOn} \times \text{nHiddenMark}) \quad (1)$$

where:
nComouflage is "0" if a pixel to be processed is included in the camouflage image, and is "1" if not;
nSmallDotOn is "1" if the level of a pixel in the background threshold pattern represents black, and is "0" if the level of the pixel represents white (color is not limited thereto);
nLargeDotOn is "1" if the level of a pixel in the foreground threshold pattern represents black, and is "0" if the level of the pixel represents white (the color is not limited thereto);
¬nHiddenMark is "1" if, in the basic image, a pixel to be processed is included in the latent image, and is "0" if the pixel is included in the background image; and
nHiddenMark is nHiddenMark negation, and is "0" for the background image area and is "1" for the background image area.

This calculation determines whether pixel levels corresponding to dots in printing mode are to be written in corresponding pixel positions. Each of the background threshold pattern and the foreground threshold pattern is image data composed of "1s" and "0s" respectively corresponding to a written dot and no written dot. Both patterns are data items binarized by dither matrices suitable for creating the foreground (latent) image and the background image.

For each pixel to be processed, all the elements of Expression (1) do not need to be used for calculation. By eliminating unnecessary calculation, higher processing speeds can be achieved.

For example, if nHiddenMark=1, ¬nHiddenMark=0. If nHiddenMark=0, ¬nHiddenmark=1. Therefore, if nHiddenMark=1, the value of the following expression may be used as the value of nLargeDotOn. If nHiddenMark=0, the value of the following expression may be used as the value of nSmallDotOn.

$$(\text{nSmallDotOn} \times \neg\text{nHiddenMark} + \text{nLargeDotOn} \times \text{nHiddenMark}) \quad (2)$$

The value of ncamouflage is integration for the entirety, as represented by Expression (1). Thus, if ncamouflage=0, nWriteDotOn=0. Therefore, if ncamouflage=0, the calculation represented by Expression (2) can be omitted.

In the generated copy-forgery-inhibited pattern image, an image whose size is the lowest common multiple of the vertical and horizontal lengths of the background threshold pattern, the foreground threshold pattern, the basic image, and the camouflage image is used as the minimum unit of repetition. Thus, the copy-forgery-inhibited-pattern-image processor 205 generates only a portion of the copy-forgery-inhibited pattern image which is the minimum unit, and repeatedly arranges, in tiled form, the portion of the copy-forgery-inhibited pattern image in the size of the copy-forgery-inhibited-pattern-image area. This can reduce the processing time for generating the copy-forgery-inhibited pattern image. In other words, by generating only each image copy-forgery-inhibited-pattern-image block 3501 shown in FIG. 24 which is a portion the copy-forgery-inhibited pattern image, and arranging the images in tiled pattern, the copy-forgery-inhibited-pattern-image processor 205 can generate the copy-forgery-inhibited pattern image 3502 shown in FIG. 24.

Turning back to FIG. 19, in step S2705, the CPU 1 makes a determination based on the result (i.e., the value of nWriteDotOn) of the calculation performed in step S2704. If nWriteDotOn=1, the process proceeds to step S2706. If nWriteDotOn=0, the process proceeds to step S2707.

In step S2706, the process writes pixel levels corresponding to printed dots. The pixel levels can be changed depending on the color of the copy-forgery-inhibited pattern image. In addition, by setting the pixel levels in conformity with toner or ink colors used in the printer 1500, the copy-forgery-inhibited pattern image can be created in color. In addition, a secondary color obtained by combining toner or ink colors can be also used.

In step S2707, it is determined whether all the pixels in the area to be processed have been processed. If all the pixels in the area have not been yet been processed, the process proceeds to step S2708, selects unprocessed pixels, and repeats steps S2704 to S2706. If all the pixels in the area have been processed, then in step S2709, the process ends.

According to this embodiment, the user can determine the existence of either the transparent printing or the overlay printing in accordance with the blank area of the document data, the presence of an area filled by a white image, and an application generating the document data. As a result, provision of a user-friendly information processing apparatus concerning copy-forgery-inhibited-pattern-image printing can be achieved.

The printer 1500 combines the copy-forgery-inhibited-pattern-image data and the document data into a bitmap image. When combining the data, if transparent printing is set, the document data is rasterized in the bitmap memory, and rasterization is performed so that the copy-forgery-inhibited pattern image overwrites the document data. At this time, simple overwriting with the copy-forgery-inhibited pattern image makes the document image invisible. Accordingly, if overlay printing is set, by using logical drawing based on AND/OR logics, complete overwriting of the document image with the copy-forgery-inhibited pattern image can be avoided. For example, when pixels of a bitmap image obtained by loading the document image data correspond to white, copy-forgery-inhibited-pattern-image data items corresponding to the pixels overwrite the pixels in the bitmap memory, and pixel levels representing color other than white are not overwritten with the copy-forgery-inhibited-pattern-image data items.

Another embodiment of the present invention is directed to a configuration for automatically selecting either transparent printing or overlay printing of the copy-forgery-inhibited pattern image.

Figure 20:
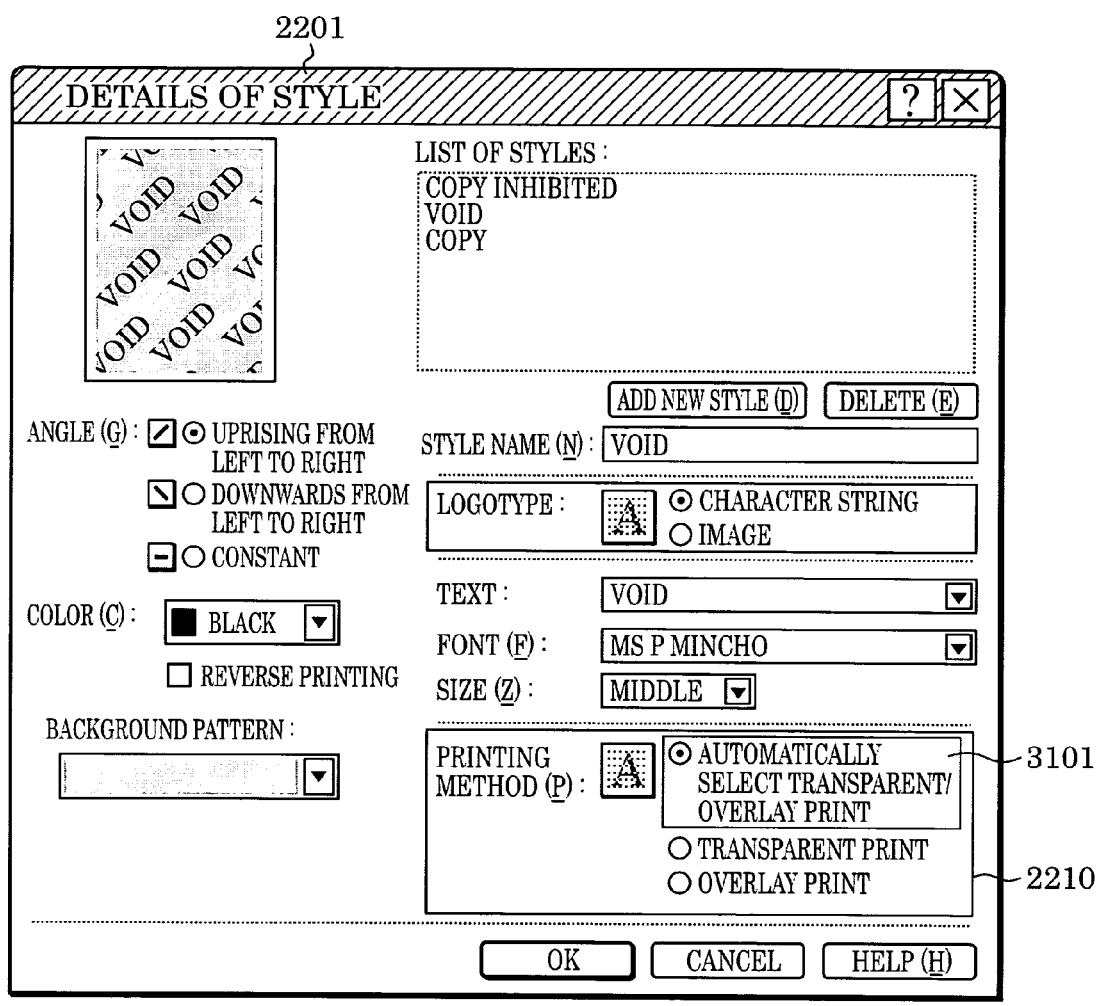
FIG. 20 is an illustration of a user interface screen, according to another embodiment of the present invention, including radio buttons for automatically selecting transparent printing or overlay printing.

This can be performed such that the user initially selects an "AUTOMATICALLY SELECT TRANSPARENT/OVERLAY PRINT" radio button 3101 in the user interface shown in FIG. 20. In other words, in this embodiment, in addition to the radio buttons 2210 described with reference to FIG. 16 for selecting the transparent printing or the overlay printing, the radio button 3101 is provided. This makes it possible to set three types of copy-forgery-inhibited-pattern-image printing.

By selecting the "AUTOMATICALLY SELECT TRANSPARENT/OVERLAY PRINT" button 3101, the contents of printing order 2003 shown in FIG. 14 are automatically determined. By using the layer determining unit 308 instead of the transparent printing and overlay printing processes described with reference to FIGS. 17 and 18, the copy-forgery-inhibited-pattern-image processor 205 determines the printing order 2003, and executes copy-forgery-inhibited-pattern-image printing in the printing order automatically changed in accordance with the determination. Although the layer determining unit 308 has been described as a module provided in the copy-forgery-inhibited-pattern-image processor 205, the layer determining unit 308 in the present invention is not limited to the described type of layer determining unit.

Figure 21:
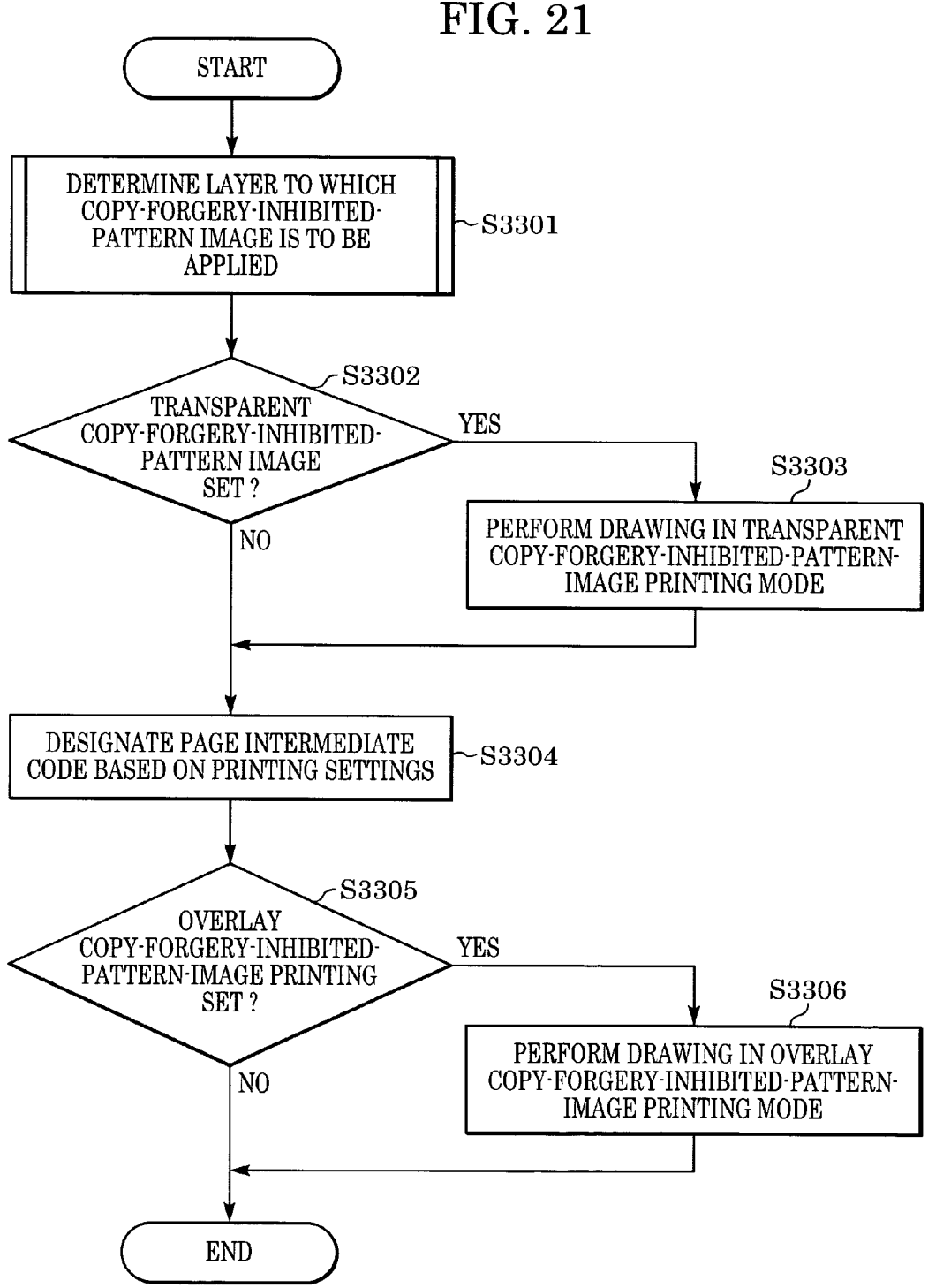
FIG. 21 is a flowchart a process based on automatic determination of transparent printing or overlay printing according to another embodiment of the present invention.

FIG. 21 is a flowchart illustrating a process based on the automatic determination.

In step S3301, the copy-forgery-inhibited-pattern-image processor 205 calls a determining process of the layer determining unit 308 for determining a copy-forgery-inhibited-pattern-image layer to be applied. A process whose details are described with reference to FIG. 22 determines the printing order 2003 for the transparent printing or the overlay printing.

In step S3302, it is determined whether the printing order 2003 determined in step S3301 is set for the transparent printing. When the printing order 2003 determined in step S3301 is set for the transparent printing, the process proceeds to step S3303. When the printing order 2003 determined in step S3301 is not set for the transparent printing, the process proceeds to step S3304. In step S3303, the drawing (in step S1901 of FIG. 17) of the copy-forgery-inhibited pattern image in transparent form is performed.

In step S3304, based on various printing settings other than those for the copy-forgery-inhibited pattern image, intermediate-code logical pages are generated. In step S3305, it is determined whether the printing order 2003 represents the overlay printing. When the overlay printing is set, the process proceeds to step S3306, where the drawing (in step S1808 of FIG. 18) is performed. When the overlay printing is not set, the process ends.

In this present invention, there no possibility that the transparent printing and the overlay printing may be set simultaneously. Thus, in another embodiment, when it is determined in step S3302 that the transparent printing is set, the process may end after step S3303.

The layer determining process of the layer determining unit 308, called in step S3301, determines whether an image which occupies a large area, other than an image (stored in intermediate code form) in logical pages provided onto physical pages, a line image not formed by brush painting, and a text image requiring no background painting, is superimposed on the tiled-form copy-forgery-inhibited pattern images.

The concept of this process is described below with reference to FIGS. 23, 24, and 25.

Figure 23:
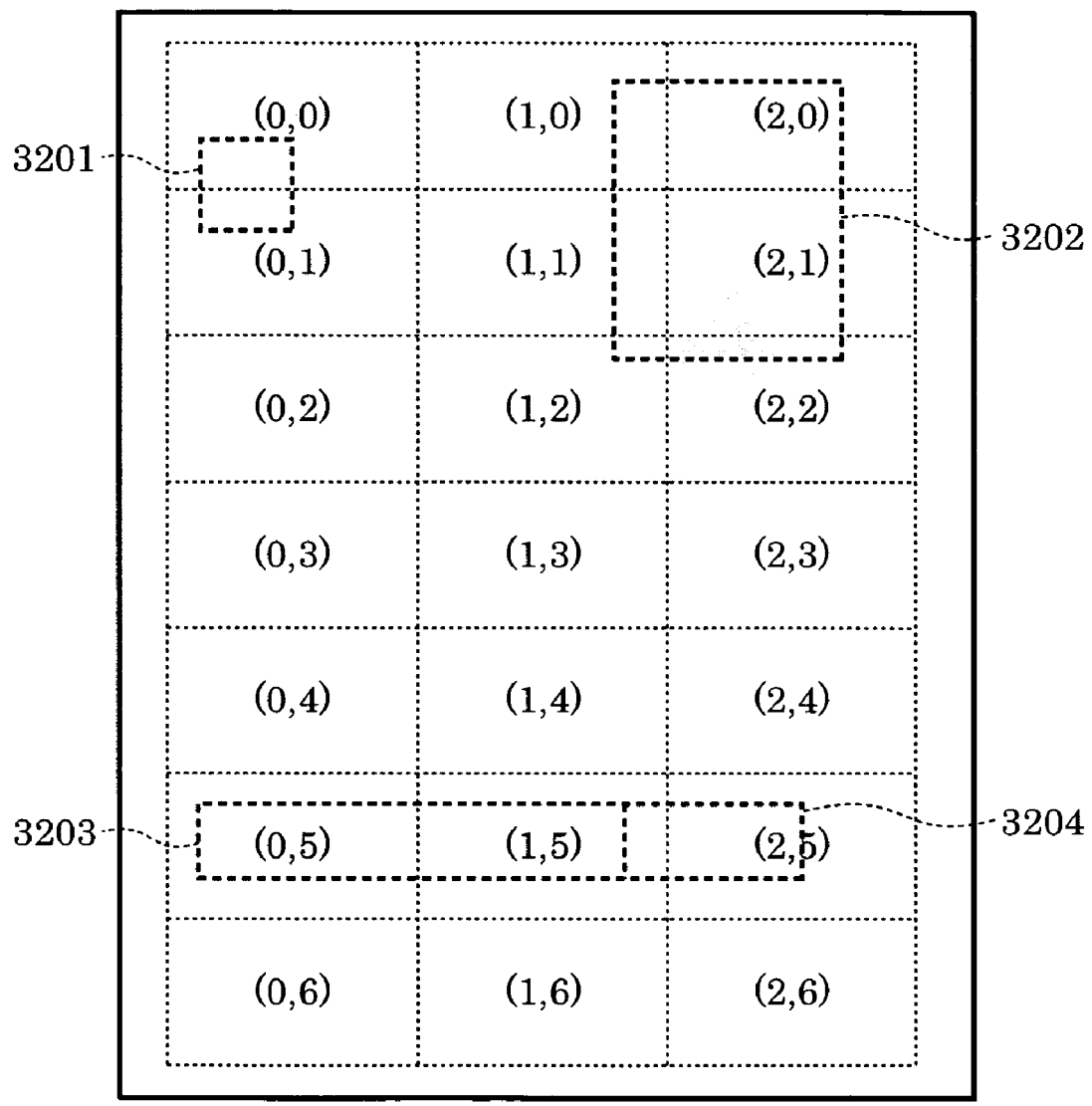
FIG. 23 is an illustration of superimposition in a copy-forgery-inhibited pattern image for use in the layer determining process.
Figure 24:
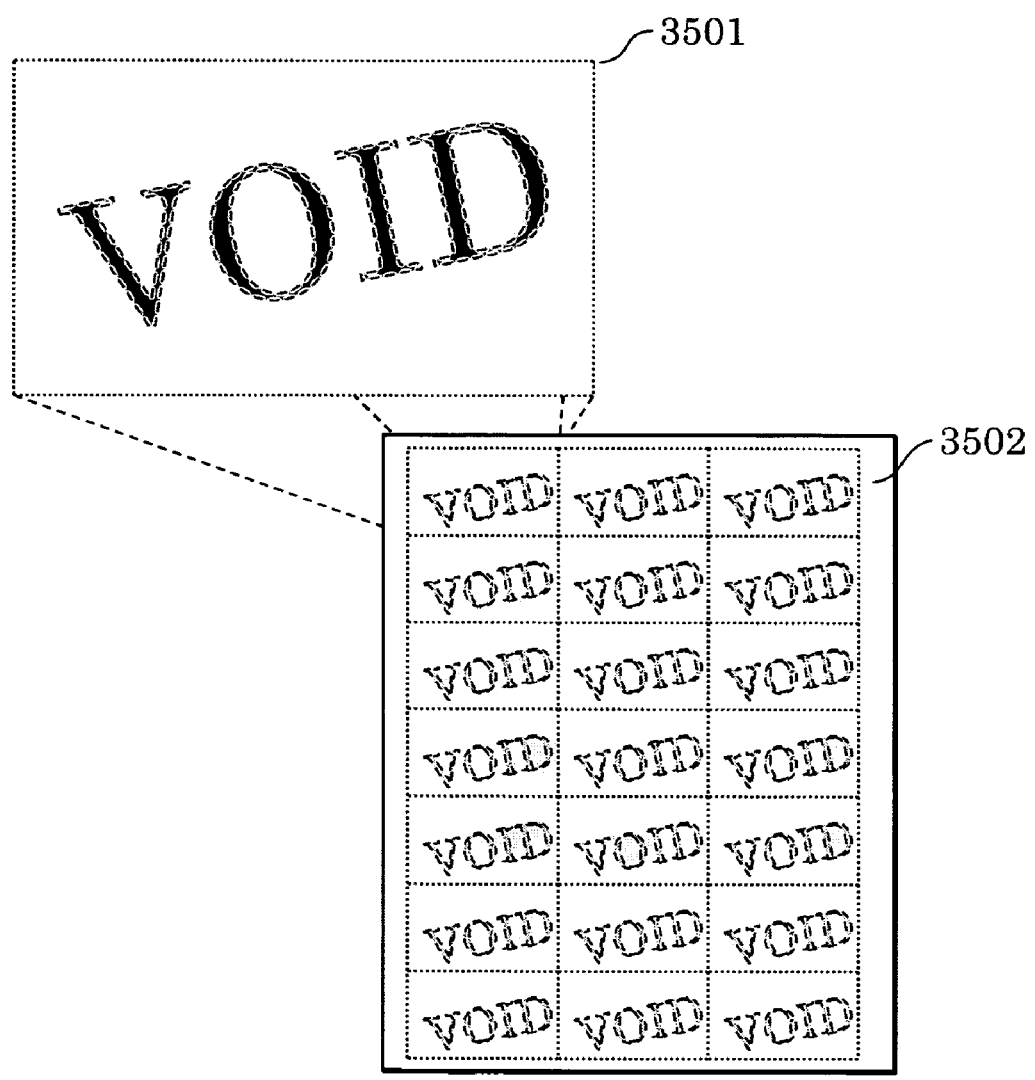
FIG. 24 is an illustration of copy-forgery-inhibited pattern images for used in the layer determining process.
Figure 25:
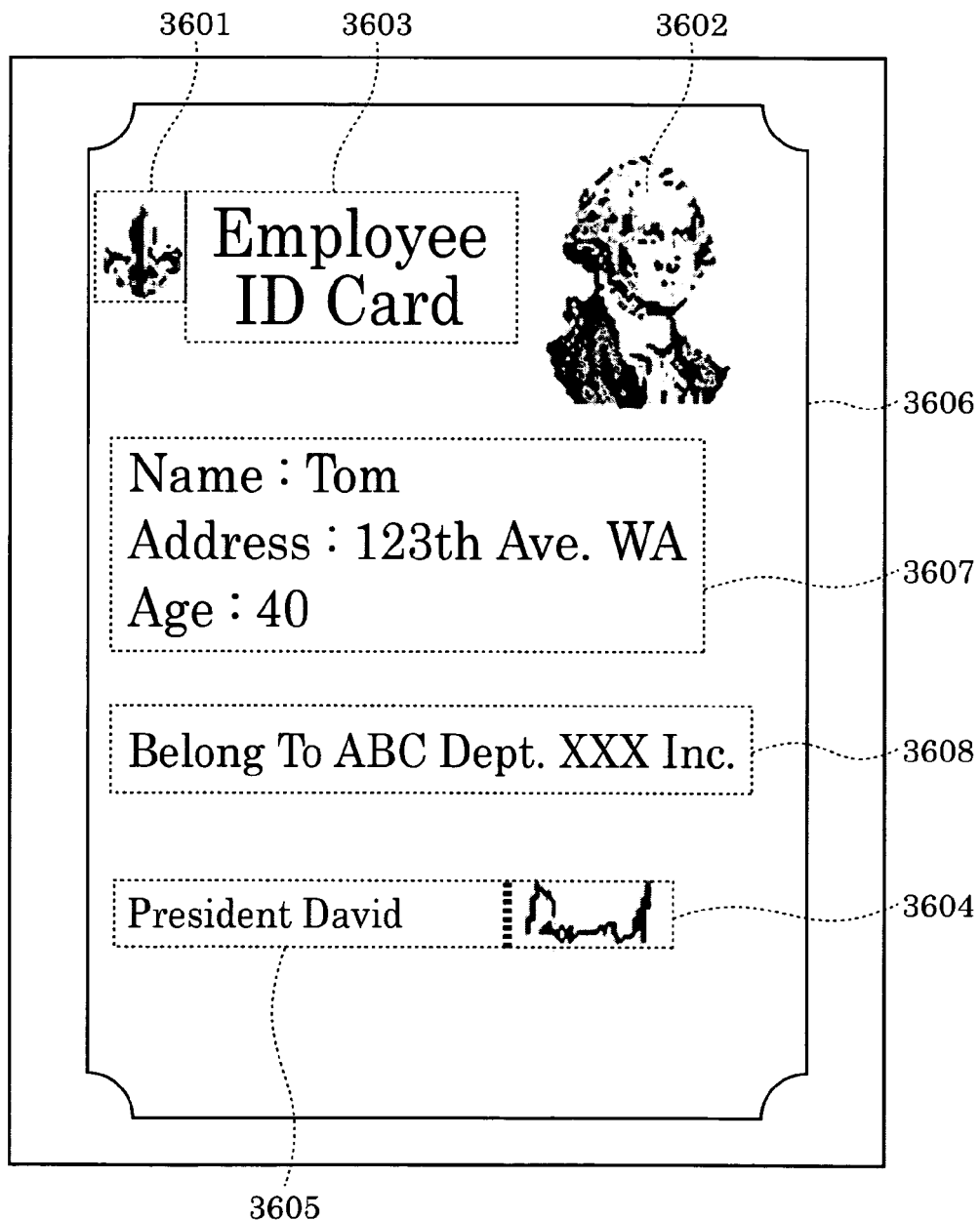
FIG. 25 is an illustration of a printed example obtained by drawing copy-forgery-inhibited pattern images and document data.
Figure 26:
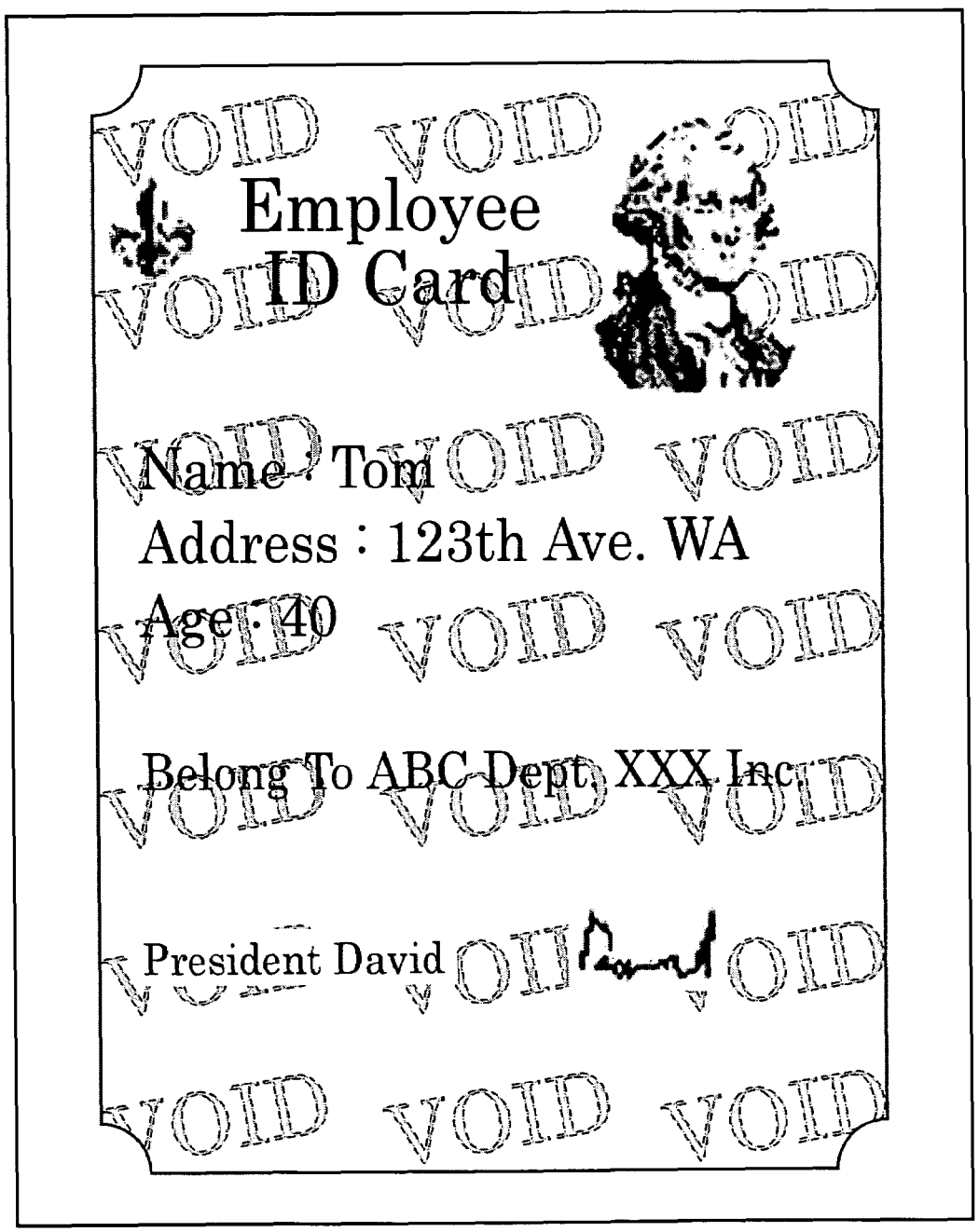
FIG. 26 is an illustration of a printed example obtained by drawing copy-forgery-inhibited pattern images and document data.
Figure 27:
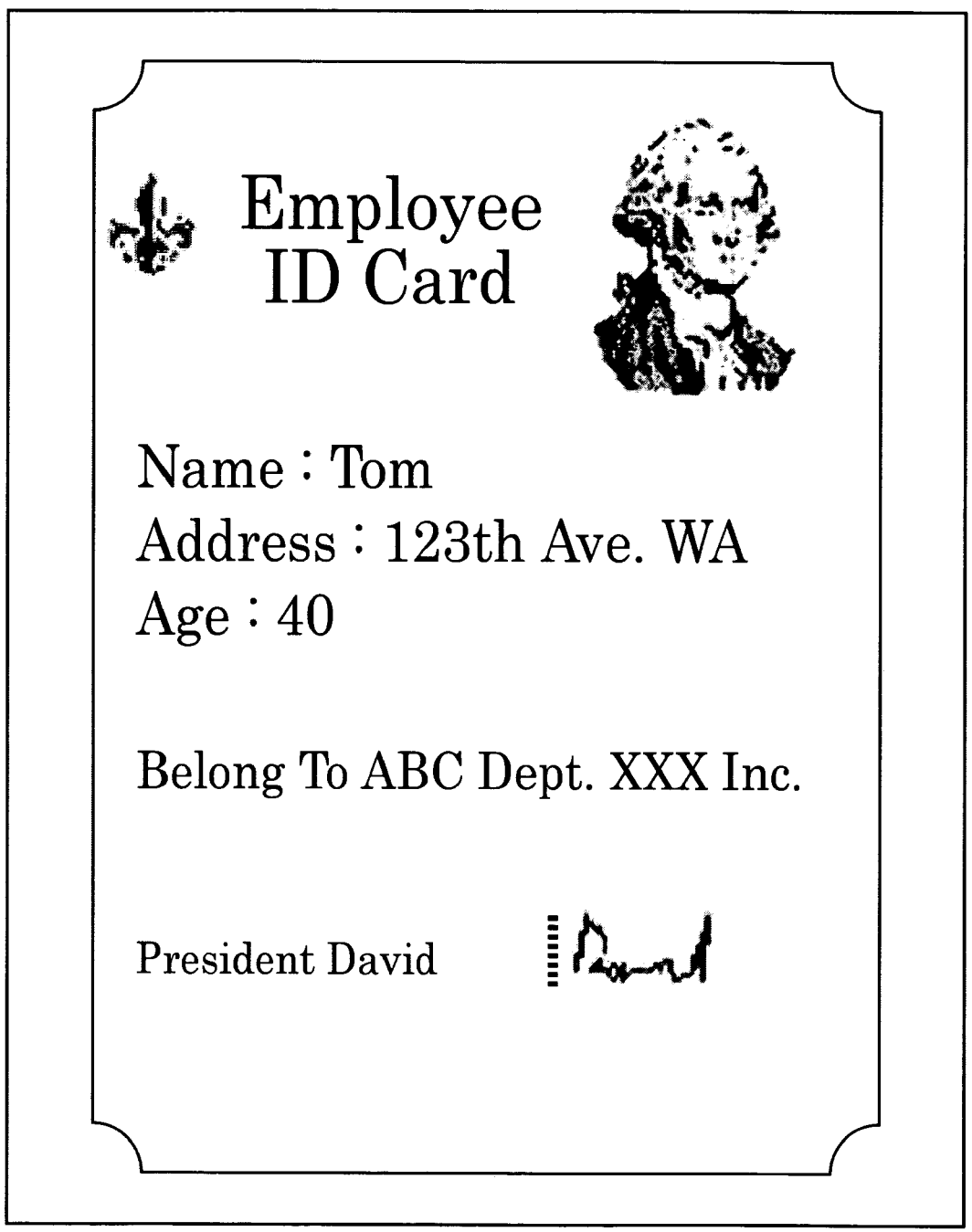
FIG. 27 is an illustration of a case in which, copy-forgery-inhibited pattern images and document data are drawn for printing, and the copy-forgery-inhibited pattern images are hidden by the document data.
Figure 28:
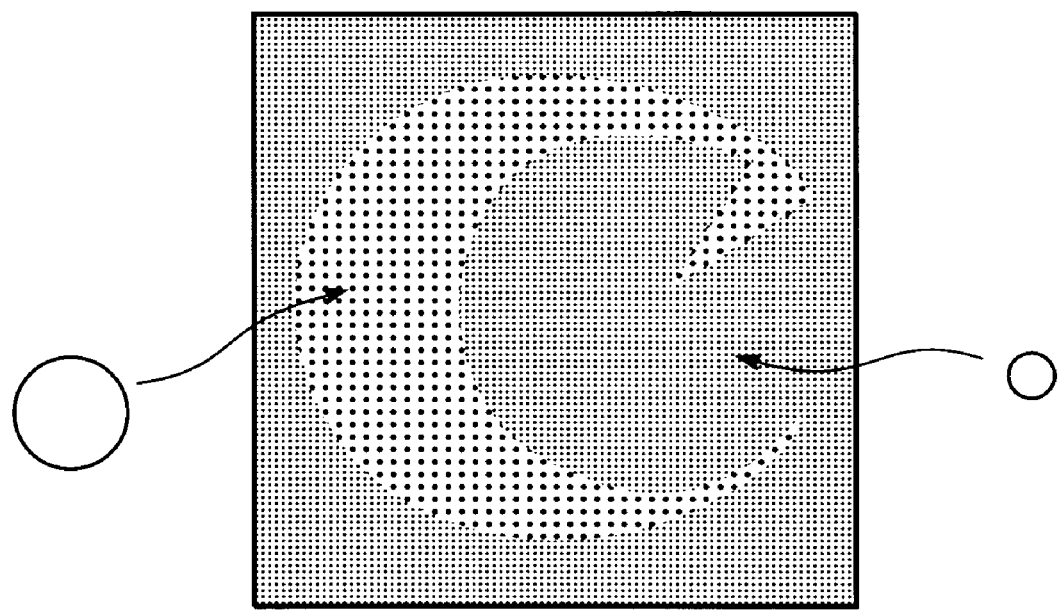
FIG. 28 is an illustration of two areas in a copy-forgery-inhibited pattern image, a latent-image area and a background-image area.
Figure 30:
FIG. 30 consists of two images illustrating camouflage in a copy-forgery-inhibited pattern image.

When the document data shown in FIG. 25 has a larger blank area, that is, when only each of a graphics image 3601, a bitmap portrait image 3602, a logotype bitmap image 3603, and a bitmap signature image 3604 has an area to be filled, in each copy-forgery-inhibited pattern image shown in FIG. 24, the gray regions of the copy-forgery-inhibited pattern image shown in FIG. 23 are superimposed. In this case, the white regions of the copy-forgery-inhibited pattern image shown in FIG. 23 are not superimposed on image portions which are formed by intermediate code data and which have a large area. Thus, as FIG. 26 shows, even in the transparent printing, latent-image areas can be recognized after copying.

Conversely, when the data shown in FIG. 25 has a smaller blank area, that is, when the graphics image 3601, the bitmap portrait image 3602, the logotype bitmap image 3603, character string data items 3607 and 3608, the bitmap signature image 3604, and, in addition, a frame line 3606, have elements to be filled with white color, they are superimposed on all the copy-forgery-inhibited pattern images shown in FIG. 24. Thus, it is impossible that the latent-image areas be recognized after copying. In this case, the overlay printing must be used.

As is understood from the above examples, for recognition of the latent-image areas after copying, it is important to find the amount of superimposition of images, other than the line image and the text image, occupying a larger area.

Figure 22:
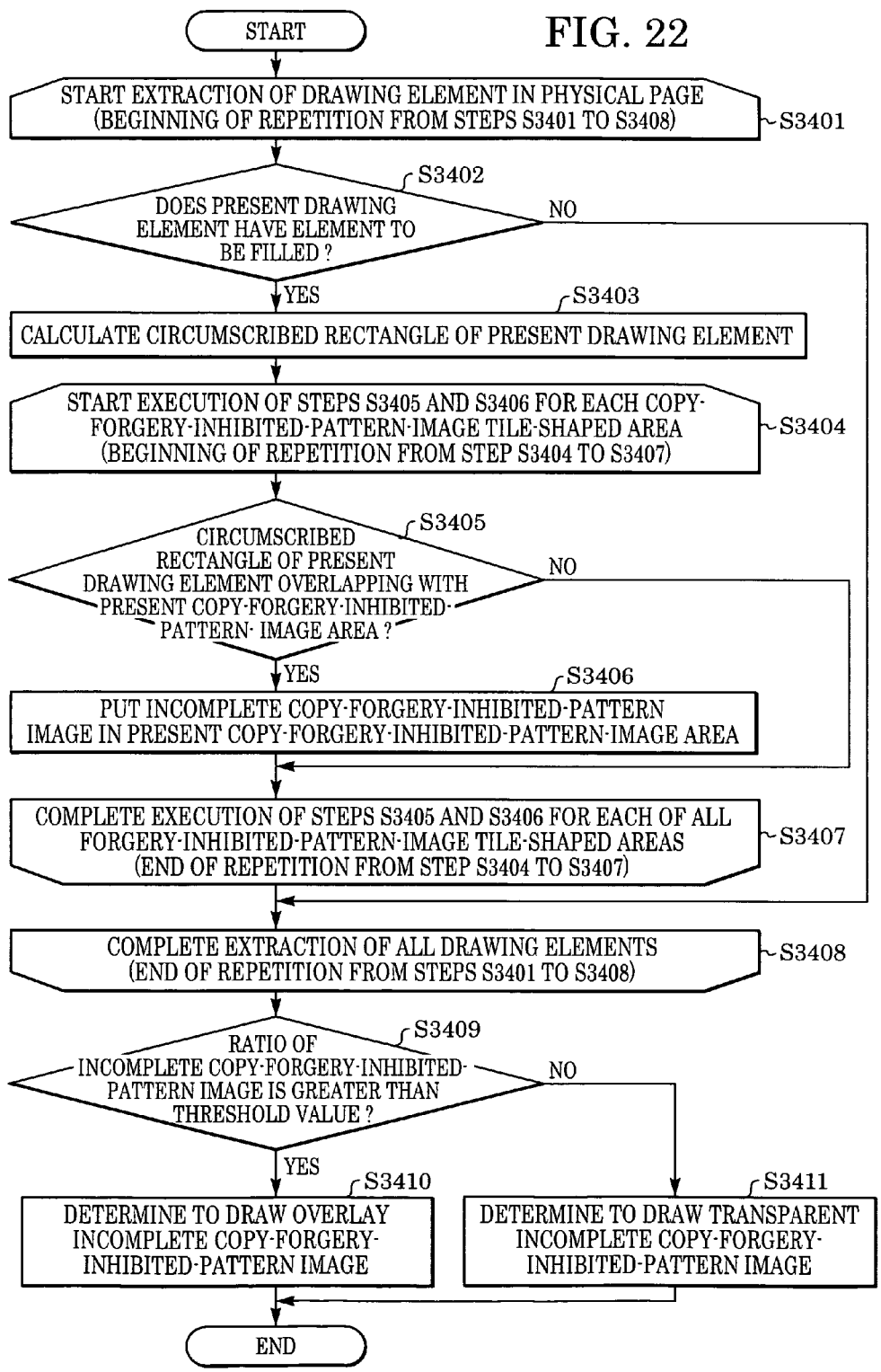
FIG. 22 is a flowchart illustrating a layer determining process called in the step S3301 shown in FIG. 21.

FIG. 22 is a flowchart illustrating a process for determining the amount of superimposition. This process is executed by the determining process of the layer determining unit 308 which is called in step S3301 shown in FIG. 21.

In step S3401, the intermediate code of logical pages associated with the present physical page, and each drawing element included in an image by an additional function set by the user are extracted as the present drawing elements for each time repetition is performed. The repetition ends in step S3408. The repetition ends at completion of extraction of all the drawing elements associated with the present physical page.

In step S3402, it is determined whether the present drawing elements have area elements to be filled in connection with the bitmap or brushing. When the present drawing elements have area elements to be filled, the process proceeds to step S3403. When the present drawing elements have no area elements to be filled, the process proceeds to step S3408.

In step S3403, the circumscribed rectangle of the present drawing elements is calculated. In step S3404, the copy-forgery-inhibited-pattern-image areas (i.e., copy-forgery-inhibited-pattern-image blocks) arranged in the form of tiles are each acquired as the present copy-forgery-inhibited-pattern-image areas. This repetition ends in step S3407. The repetition ends at completion of acquisition of all the copy-forgery-inhibited-pattern-image areas.

In step S3405, it is determined whether the circumscribed rectangle of the present drawing elements overlaps with the rectangle of the present copy-forgery-inhibited-pattern-image areas. When the circumscribed rectangle of the present drawing elements overlap, the process proceeds to step S3406. When the circumscribed rectangle of the present drawing elements does not overlap, the process proceeds to step S3407. In step S3406, a predetermined mark (flag data) representing an incomplete copy-forgery-inhibited-pattern image is put to the present copy-forgery-inhibited-pattern-image areas. The incomplete copy-forgery-inhibited-pattern image represents association with drawing elements forming filled areas.

In step S3409, the ratio of the number of incomplete copy-forgery-inhibited pattern images, each image with the predetermined mark put thereto, to the number of all the copy-forgery-inhibited pattern images in the form of tiles, is calculated, and it is determined whether the calculated ratio is greater than a predetermined threshold value. When the ratio is greater than the threshold value, the process proceeds to step S3410. When the ratio is not greater than the threshold value, the process proceeds to step S3411.

In step S3410, determination of the overlay printing is registered in the printing order 2003. In step S3411, determination of the transparent printing is registered in the printing order 2003.

As described above, in response to the overlapping area between a document image to be printed and the copy-forgery-inhibited pattern image, either the transparent printing or overlay printing is determined to print the copy-forgery-inhibited pattern image to the document image. Thus, optimal copy-forgery-inhibited-pattern-image printing can be automatically used without requiring the user to select either type of printing.

In the above embodiment, when the user selects radio buttons 2210 to select the transparent printing or the overlay printing, corresponding printing as described in the first embodiment is performed. Also in this case, the process described with reference to FIG. 22 may be started. It is determined whether determination obtained by the process coincides with the user's selection. When there is no coincidence, the state may be reported to the user for re-selection through the user interface. Alternatively, the printing order may forcibly be changed to the appropriate order.

In the above embodiment, the copy-forgery-inhibited pattern images in the form of tiles have been described. However, even if a single copy-forgery-inhibited pattern image is superimposed on the entire page, by determining whether the copy-forgery-inhibited-pattern-image areas have no image elements, other than the line image and the text image, occupying a larger area, the determination may be used as a criterion for automatically determining transparent printing or overlay printing. In this case, the number of repetitions in step S3404 in FIG. 21 is only one. The processing method is identical to that of the above embodiment.

In addition, by further dividing the copy-forgery-inhibited-pattern image block 3501 in tiled form into block portions, it may be determined whether each divided block portion has no image element, other than the line image and the text image, occupying a larger area. In this case, the number of repetitions in step S3404 shown in FIG. 21 is only multiplied by the divisor. The processing method is identical to that of the above embodiment.

Printers include a type of printer in which copy-forgery-inhibited-pattern-image rasterization, for use in transparent printing, use logical operations such as OR and AND operations, which is less efficient in printing speed and image reproduction than overwriting drawing in overlay printing. For that type of printer, when transparent printing of the copy-forgery-inhibited pattern image is performed, transparent printing can be used only for the incomplete copy-forgery-inhibited-pattern-image area, and overlay printing can be used to print the other areas.

Some applications perform initial drawing of filling a page in white. This initial drawing does not make sense. Therefore, by identifying an application name and analyzing drawing elements about whether the initial drawing has been performed, deletion of the initial drawing, which is meaningless, can improve automatic determining accuracy.

According to the above-described embodiments, based on the amount of superimposition between a copy-forgery-inhibited pattern image and a printing image in a printable area on a printing medium, a determining process is executed which determines which is to be performed between creating printing data so that a copy-forgery-inhibited pattern image is drawn before drawing a printing image, and creating printing data so that a printing image is drawn before drawing a copy-forgery-inhibited pattern image. Since the printing data is created based on the determination, automatic printing having appropriate superimposition, for recognition, of a copy-forgery-inhibited pattern image can be performed without user's instructions.

As a result, regarding recognition of a copy-forgery-inhibited pattern image, the copy-forgery-inhibited pattern image can be appropriately used, and a user-friendly information processing apparatus concerning copy-forgery-inhibited-pattern-image printing can be provided.

Although the processes in the above-described embodiments are executed by the host computer 3000, the present invention is not limited to the above-described embodiments. The processes in the above-described embodiments may be executed by the printer 1500. In this case, by building a module corresponding to the copy-forgery-inhibited-pattern-image processor 205 into the printer 1500, the processes are executable.

In the configuration of each of the above-described embodiments, document data and copy-forgery-inhibited-pattern-image data are sent as a page description language to the printer 1500, and the printer 1500 performs rasterization to generate a bitmap image composed of the document data and the copy-forgery-inhibited-pattern-image data. However, the present invention is not limited to the above configuration. The host computer 3000 can create a bitmap image obtained by combining the document data and the copy-forgery-inhibited-pattern-image data and can transmit the bitmap data to the printer 1500.

The present invention may be applied to a system constituted by a plurality of apparatuses such as a host computer, an interface unit, a reader, and a printer, and, also to a single apparatus such as a copying machine, a printer, or a facsimile machine.

The object of the present invention is also achieved such that, from a storage medium storing program code which realizes the functions of the above-described embodiments and which realizes the procedures of the shown flowcharts, the stored program is read and executed by a computer (CPU or MPU) in a system or apparatus.

In this case, the program code read from the storage medium, itself, realizes the functions of the above-described embodiments. Thus, the storage medium storing the program code is included in the present invention.

Storage media for providing the program code include, for example, a floppy disk, a hard disk, an optical disk, a magneto-optical disk, a compact-disk read-only memory (CD-ROM), a CD-R, a magnetic tape, a nonvolatile memory card, and a ROM.

The present invention includes not only a case in which, by executing the program code read by the computer, the functions of the above-described embodiments are realized, but also a case in which, based on instructions of the program code, an operating system running on the computer performs all or part of actual processing, and the processing realizes the functions of the above-described embodiments.

In addition, the present invention also includes a case in which, after the program code read from the storage medium is written in a memory provided in an add-in board inserted into the computer and in an add-in unit connected to the computer, based on instructions of the program code, a CPU provided in the add-in board or unit performs all or part of actual processing, and the processing realizes the functions of the above-described embodiments.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing apparatus for generating printing image data of a printing image and copy-forgery-inhibited pattern image data of a copy-forgery-inhibited pattern image to be added to the printing image, the copy-forgery-inhibited pattern image including a latent image and a background image, said information processing apparatus comprising:
    a selecting unit for selecting either the transparent-printing designation or overlay-printing designation, the transparent-printing designation being used for generating printing data so that the copy-forgery-inhibited pattern image is superimposed on the printing image, the overlay-printing designation being used for generating printing data so that the printing image is superimposed on the copy-forgery-inhibited pattern image; and
    a printing-data generating unit for generating printing data based on the printing designation selected by said selecting unit.

2. The information processing apparatus according to claim 1, further comprising a determining unit for executing a determining process of determining a state of superimposition between the copy-forgery-inhibited pattern image data and the printing image data, and executing a selecting process of selecting either the transparent-printing designation or the overlay-printing designation,
    wherein said selecting unit further has automatic selecting designation for executing the selecting process of said determining unit.

3. The information processing apparatus according to claim 2, wherein:
    the copy-forgery-inhibited pattern image data is constituted by a plurality of copy-forgery-inhibited pattern image blocks, and the printing image data is constituted by a predetermined element; and
    said determining unit executes the selecting process in accordance with the ratio of the number of copy-forgery-inhibited pattern image blocks, which are overlaid with the predetermined element, to the total number of copy-forgery-inhibited-pattern image blocks.

4. The information processing apparatus according to claim 2, wherein said determining unit executes the determining process when either the transparent-printing designation or the overlay-printing designation is selected by said selecting unit, and reports a difference in designation to a user when the printing designation selected based on the result of determination in the selecting process differs from the printing designation selected by said selecting unit.

5. The information processing apparatus according to claim 2, wherein said determining unit executes the determining process when said selecting unit selects either the transparent-printing designation or the overlay-printing designation, and executes a process of changing to the printing designation selected by the selecting process when the printing designation selected based on the result of determination in the selecting process differs from the printing designation selected by said selecting unit.

6. An information processing apparatus for generating printing image data of a printing image and copy-forgery-inhibited pattern image data of a copy-forgery-inhibited pattern image to be added to the printing image, the copy-forgery-inhibited pattern image including a latent image and a background image, said information processing apparatus comprising:
    a layer determining unit for executing a determining process of determining one of two printing manners on the basis of the amount of superimposition between the copy-forgery-inhibited pattern image and the printing image in a printable area on a printing medium, one printing manner being used for superimposing the copy-forgery-inhibited pattern image on the printing image, the other printing manner being used for superimposing the printing image on the copy-forgery-inhibited pattern image; and
    a printing-data generating unit for generating printing data in response to the result of determination in the determining process executed by said layer determining unit.

7. The information processing apparatus according to claim 6, wherein:
    the copy-forgery-inhibited pattern image is constituted by a plurality of copy-forgery-inhibited pattern image blocks, and the printing image is constituted by a predetermined element; and
    said layer determining unit executes the determining process in accordance with the ratio of the number of copy-forgery-inhibited pattern image blocks, which are overlaid with the predetermined element, to the total number of copy-forgery-inhibited pattern image blocks.

8. An information processing method for generating printing image data of a printing image and copy-forgery-inhibited pattern image data of a copy-forgery-inhibited pattern image to be added to the printing image, the copy-forgery-inhibited pattern image including a latent image and a background image, said information processing method comprising:
    a selecting step of selecting either the transparent-printing designation or the overlay-printing designation, the transparent-printing designation being used for generating printing data so that the copy-forgery-inhibited pattern image is superimposed on the printing image, the overlay-printing designation being used for generating printing data so that the printing image is superimposed on the copy-forgery-inhibited pattern image; and
    a printing-data generating step of generating printing data based on the printing designation selected in the selecting step.

9. The information processing method according to claim 8, further comprising a determining step of executing a determining process of determining a state of superimposition between the copy-forgery-inhibited pattern image data and the printing image data and a selecting process of selecting either the transparent-printing designation or the overlay-printing designation,
    wherein the selecting step includes an automatic designation-selecting step of executing the selecting process in the determining step.

10. The information processing method according to claim 9, wherein:
    the copy-forgery-inhibited pattern image data is constituted by a plurality of copy-forgery-inhibited pattern image blocks, and the printing image data is constituted by a predetermined element; and in the determining step, the selecting process is executed in accordance with the ratio of the number of copy-forgery-inhibited pattern image blocks, which are overlaid with the predetermined element, to the total number of copy-forgery-inhibited pattern image blocks.

11. The information processing method according to claim 9, wherein, in the determining step, the determining process is executed when either the transparent-printing designation or the overlay-printing designation is selected in the selecting step, and a process of reporting a difference in designation to a user is executed when the printing designation selected based on the result of the determination differs from the printing designation selected in the selecting step.

12. The information processing method according to claim 9, wherein, in the determining step, the determining process is executed when either the transparent-printing designation or the overlay-printing designation is selected in the selecting step, and a process of changing to the printing designation selected by the selecting process is executed when the printing designation selected based on the result of the determination differs from the printing designation selected in the selecting step.

13. An information processing method for generating printing image data of a printing image and copy-forgery-inhibited pattern image data of a copy-forgery-inhibited pattern image to be added to the printing image, the copy-forgery-inhibited pattern image including a latent image and a background image, said information processing method comprising:

a layer determining step of executing a determining process of determining one of two printing manners on the basis of the amount of superimposition between the copy-forgery-inhibited pattern image and the printing image in a printable area on a printing medium, one printing manner being used for superimposing the copy-forgery-inhibited pattern image on the printing image, the other printing manner being used for superimposing the printing image on the copy-forgery-inhibited pattern image; and a printing-data generating step of generating printing data in response to the result of determination by the determining process in the layer determining step.

14. The information processing method according to claim 13, wherein:

the copy-forgery-inhibited pattern image is constituted by a plurality of copy-forgery-inhibited pattern image blocks, and the printing image is constituted by a predetermined element; and in the layer determining step, the determining process is executed in accordance with the ratio of the number of copy-forgery-inhibited pattern image blocks, which are overlaid with the predetermined element, to the total number of copy-forgery-inhibited pattern image blocks.

15. A computer-readable storage medium storing, in computer-executable form, a control program for generating printing image data of a printing image and copy-forgery-inhibited pattern image data of a copy-forgery-inhibited pattern image to be added to the printing image, the copy-forgery-inhibited pattern image including a latent image and a background image, said control program executing:

a selecting step of selecting either the transparent-printing designation or the overlay-printing designation, the transparent-printing designation being used for generating printing data so that the copy-forgery-inhibited pattern image is superimposed on the printing image, the overlay-printing designation being used for generating printing data so that the printing image is superimposed on the copy-forgery-inhibited pattern image; and a printing-data generating step of generating printing data based on the printing designation selected in the selecting step.

16. The computer-readable storage medium according to claim 15, wherein the control program further comprises a determining step of executing a determining process of determining a state of superimposition between the copy-forgery-inhibited pattern image data and the printing image data and a selecting process of selecting either the transparent-printing designation or the overlay-printing designation, wherein the selecting step includes an automatic designation-selecting step of executing the selecting process in the determining step.

17. The computer-readable storage medium according to claim 16, wherein:

the copy-forgery-inhibited pattern image data is constituted by a plurality of copy-forgery-inhibited pattern image blocks, and the printing image is constituted by a predetermined element; and in the determining step, the selecting process is executed in accordance with the ratio of the number of copy-forgery-inhibited pattern image blocks, which are overlaid with the predetermined element, to the total number of copy-forgery-inhibited pattern image blocks.

18. The computer-readable storage medium according to claim 16, wherein, in the determining step, the determining process is executed when either the transparent-printing designation or the overlay-printing designation is selected in the selecting step, and a process of reporting a difference in designation to a user is executed when the printing designation selected by the selecting process based on the result of the determination differs from the printing designation selected in the selecting step.

19. The computer-readable storage medium according to claim 16, wherein, in the determining step, the determining process is executed when either the transparent-printing designation or the overlay-printing designation is selected in the selecting step, and a process of changing to the printing designation selected by the selecting process is executed when the printing designation selected by the selecting process based on the result of the determination differs from the printing designation selected in the selecting step.

20. A computer-readable storage medium storing, in computer-executable form, a control program for generating printing image data of a printing image and copy-forgery-inhibited pattern image data of a copy-forgery-inhibited pattern image to be added to the printing image, the copy-forgery-inhibited pattern image including a latent image and a background image, said control program executing:

a layer determining step of executing a determining process of determining one of two printing manners on the basis of the amount of superimposition between the copy-forgery-inhibited pattern image and the printing image in a printable area on a printing medium, one printing manner being used for superimposing the copy-forgery-inhibited pattern image on the printing image, the other printing manner being used for superimposing the printing image on the copy-forgery-inhibited pattern image; and a printing-data generating step of generating printing data in response to the result of the determination by the determining process in the layer determining step.

21. The computer-readable storage medium according to claim 20, wherein:

the copy-forgery-inhibited pattern image is constituted by a plurality of copy-forgery-inhibited pattern image blocks, and the printing image is constituted by a predetermined element; and in the layer determining step, the determining process is executed in accordance with the ratio of the number of copy-forgery-inhibited pattern image blocks, which are overlaid with the predetermined element, to the total number of copy-forgery-inhibited pattern image blocks.

* * * * *